United States Patent
Holt et al.

(10) Patent No.: US 8,712,982 B2
(45) Date of Patent: Apr. 29, 2014

(54) VIRTUAL MULTI-CLUSTER CLOUDS

(75) Inventors: Gregory Lee Holt, Hollywood Park, TX (US); Clay Gerrard, San Antonio, TX (US); David Patrick Goetz, San Antonio, TX (US); Michael Barton, San Antonio, TX (US)

(73) Assignee: Rackspace US, Inc., San Antonio, TX (US)

( * ) Notice: Subject to any disclaimer, the term of this patent is extended or adjusted under 35 U.S.C. 154(b) by 125 days.

(21) Appl. No.: 13/278,876

(22) Filed: Oct. 21, 2011

(65) Prior Publication Data

US 2012/0233251 A1    Sep. 13, 2012

Related U.S. Application Data

(63) Continuation of application No. 13/089,442, filed on Apr. 19, 2011.

(60) Provisional application No. 61/450,166, filed on Mar. 8, 2011, provisional application No. 61/479,299, filed on Apr. 26, 2011.

(51) Int. Cl.
*G06F 17/30* (2006.01)

(52) U.S. Cl.
USPC ........... 707/698; 707/831; 707/959; 709/251; 709/238

(58) Field of Classification Search
CPC .................. G06F 17/30067; G06F 2221/2107; G06F 9/5061
USPC .......... 707/698, 831, 959; 709/220, 238, 240, 709/251
See application file for complete search history.

(56) References Cited

U.S. PATENT DOCUMENTS

| 6,446,092 | B1 | 9/2002 | Sutter |
| RE42,860 | E | 10/2011 | Velez-McCaskey et al. |
| 8,046,424 | B2 | 10/2011 | Novik et al. |
| 8,307,028 | B2 * | 11/2012 | Kakivaya et al. ............. 709/201 |

(Continued)

FOREIGN PATENT DOCUMENTS

EP       2239886 A1    10/2010

OTHER PUBLICATIONS

European Search Report received in European Application No. 12001564.9, dated Nov. 28, 2012, 5 pages.

(Continued)

*Primary Examiner* — Leslie Wong
(74) *Attorney, Agent, or Firm* — Haynes and Boone, LLP

(57) ABSTRACT

An improved scalable object storage system allows multiple clusters to work together. Users working with a first cluster, or with a multi-cluster gateway, can ask for services and have the request or data transparently proxied to a second cluster. This gives transparent cross-cluster replication, as well as multi-cluster compute or storage farms based upon spot availability or various provisioning policies. Vendors providing a cloud storage "frontend" can provide multiple backends simultaneously. In one embodiment, a multi-cluster gateway can have a two, three, or higher-level ring that transparently matches an incoming request with the correct cluster. In the ring, a request is first mapped to an abstract "partition" based on a consistent hash function, and then one or more constrained mappings map the partition number to an actual resource. In another embodiment, the multi-cluster gateway is a dumb gateway, and the rings are located only at the cluster level.

22 Claims, 12 Drawing Sheets

(56) References Cited

U.S. PATENT DOCUMENTS

| | | | |
|---|---|---|---|
| 2002/0027886 A1 | 3/2002 | Fischer et al. | |
| 2002/0114341 A1 | 8/2002 | Sutherland et al. | |
| 2003/0187945 A1 | 10/2003 | Lubbers et al. | |
| 2005/0044108 A1 | 2/2005 | Shah et al. | |
| 2005/0223047 A1 | 10/2005 | Shah et al. | |
| 2006/0031933 A1 | 2/2006 | Costa et al. | |
| 2006/0088039 A1* | 4/2006 | Kakivaya et al. | 370/400 |
| 2006/0184473 A1 | 8/2006 | Eder | |
| 2006/0193632 A1 | 8/2006 | Risbood | |
| 2006/0259587 A1 | 11/2006 | Ackerman | |
| 2006/0282547 A1* | 12/2006 | Hasha et al. | 709/251 |
| 2007/0094357 A1 | 4/2007 | Sugitani et al. | |
| 2007/0168516 A1 | 7/2007 | Liu et al. | |
| 2008/0052322 A1 | 2/2008 | Gusciora | |
| 2009/0006888 A1 | 1/2009 | Bernhard et al. | |
| 2009/0172139 A1 | 7/2009 | Wong et al. | |
| 2009/0216910 A1* | 8/2009 | Duchesneau | 709/250 |
| 2010/0103781 A1 | 4/2010 | Rai et al. | |
| 2010/0115009 A1 | 5/2010 | Callahan et al. | |
| 2010/0118895 A1 | 5/2010 | Radulescu | |
| 2010/0131649 A1 | 5/2010 | Ferris | |
| 2010/0199042 A1 | 8/2010 | Bates et al. | |
| 2010/0251002 A1 | 9/2010 | Sivasubramanian et al. | |
| 2010/0262717 A1* | 10/2010 | Critchley et al. | 709/251 |
| 2010/0293333 A1* | 11/2010 | Krishnaprasad et al. | 711/123 |
| 2010/0306354 A1 | 12/2010 | DeHaan et al. | |
| 2011/0161293 A1 | 6/2011 | Vermeulen et al. | |
| 2011/0184920 A1 | 7/2011 | Vosshall et al. | |
| 2011/0320403 A1 | 12/2011 | O'Krafka et al. | |
| 2012/0036237 A1* | 2/2012 | Hasha et al. | 709/221 |
| 2012/0110173 A1 | 5/2012 | Luna et al. | |
| 2012/0185437 A1* | 7/2012 | Pavlov et al. | 707/652 |
| 2013/0013571 A1 | 1/2013 | Sorenson, III et al. | |

OTHER PUBLICATIONS

International Search Report and Written Opinion issued for PCT/US2013/029274 dated Jun. 21, 2013, 12 pages.

Llorente et al., "Cloud Computing for on-Demand Grid Resource Provisioning", High Speed and Large Scale Scientific Computing, IOS Press Jan. 1, 2009, pp. 177-191, Amsterdam, NL.

Crago et al., "Heterogeneous Cloud Computing", 2011 IEEE International Conference on Cluster Computing, Sep. 26, 2011, pp. 378-385.

Cordeiro et al., "Open Source Cloud Computing Platforms", 2010 Ninth International Conference on Grid and Cloud Computing, Nov. 1, 2010, pp. 366-371, Piscataway, NJ, USA.

European Search Report received in European Application No. 12001563.1, dated Mar. 4, 2013, 11 pages.

* cited by examiner

VIRTUAL MULTI-CLUSTER CLOUDS

BACKGROUND

This is a continuation application of and claims priority to the U.S. patent application 13/089,442 filed Apr. 19, 2011, entitled "Massively Scalable Object Storage System," which claims the benefit of U.S. provisional patent application 61/450,166, filed Mar. 8, 2011, entitled "Massively Scalable File Storage System." This application also claims priority to U.S. provisional patent application 61/479,299, filed Apr. 26, 2011, entitled "Multi-Region replication System." This application is also related to co-pending non-provisional U.S. patent applications nos. 13/089,476, 13/089,487, and 13/089,510, all filed Apr. 19, 2011. The entirety of these disclosures is hereby incorporated herein by reference.

The present disclosure relates generally to cloud computing, and more particularly to a massively scalable object storage system to provide storage for a cloud computing environment. Cloud computing services can provide computational capacity, data access, networking/routing and storage services via a large pool of shared resources operated by a cloud computing provider. Because the computing resources are delivered over a network, cloud computing is location-independent computing, with all resources being provided to end-users on demand with control of the physical resources separated from control of the computing resources.

As a term, "cloud computing" describes a consumption and delivery model for IT services based on the Internet, and it typically involves over-the-Internet provisioning of dynamically scalable and often virtualized resources. This frequently takes the form of web-based tools or applications that users can access and use through a web browser as if it were a program installed locally on their own computer. Details are abstracted from consumers, who no longer have need for expertise in, or control over, the technology infrastructure "in the cloud" that supports them. Most cloud computing infrastructures consist of services delivered through common centers and built on servers. Clouds often appear as single points of access for consumers' computing needs, and do not require end-user knowledge of the physical location and configuration of the system that delivers the services.

Because the flow of services provided by the cloud is not directly under the control of the cloud computing provider, cloud computing requires the rapid and dynamic creation and destruction of computational units, frequently realized as virtualized resources. Maintaining the reliable flow and delivery of dynamically changing computational resources on top of a pool of limited and less-reliable physical servers provides unique challenges. Accordingly, it is desirable to provide a better-functioning cloud computing system with superior operational capabilities.

SUMMARY

In one embodiment, a trust and federation relationship is established between a first cluster and a second cluster. This is done by designating a first cluster as a trust root. The trust root receives contact from another cluster, and the two clusters exchange cryptographic credentials. The two clusters mutually authenticate each other based upon the credentials, and optionally relative to a third identity, authorization, or authentication service. Following the authentication of the two clusters, a service connection is established between the two clusters and services from the remote cluster are registered as being available to the cluster designated as the trust root. In further embodiments, a multi-cluster gateway is designated as the trust root, and the two clusters can be mutually untrusting. In a third embodiment, the remote cluster can be also designated as a trust root, and two one-way trust and federation relationships can be set up to form a trusted bidirectional channel.

When a trusted connection is set up between the two clusters, a user working with the first cluster, or with a multi-cluster gateway, can ask for services and have the request or data transparently proxied to the second cluster. Cross-cluster replication is one anticipated service, as are multi-cluster compute or storage farms based upon spot availability or various provisioning policies. For example, a vendor providing a cloud storage "frontend" could provide multiple backends simultaneously using the trust and federation relationship.

In one embodiment, a multi-cluster gateway can have a two, three, or higher-level ring that transparently matches an incoming request with the correct cluster. In the ring, a request is first mapped to an abstract "partition" based on a consistent hash function, and then one or more constrained mappings map the partition number to an actual resource. In another embodiment, the multi-cluster gateway is a dumb gateway, and the rings are located only at the cluster level.

Various embodiments use existing cryptographic or authentication protocols when exchanging tokens or verifying each other; shared secrets, a public/private keypairs, a digital certificates, Kerberos, XAUTH and OAUTH are all contemplated. Separate authentication entities are also contemplated, such as an OpenID provider, LDAP store, or RADIUS server.

In another embodiment, there is a multi-cluster synchronization system between two or more clusters. Each cluster has a cluster-internal network, with object storage services and container services. The container services track and replicate metadata associated with the object storage service. An inter-cluster network connects the two clusters and performs a one-way synchronization of the objects and metadata associated with a particular container. This can be done either through the direct association of the container and object storage services, such as through a trust and federation relationship, or it can be opaque, so that the cross-cluster replication treats the remote repository as a black box and uses the external API to call and manipulate the files.

In a further embodiment, multiple synchronization relationships can be set up, either in a cycle (with two or more participants), in a line, or in a tree. For example, the multi-cluster replication could be used to transparently synchronize objects in a CDN network.

In another embodiment, the multi-cluster synchronization system uses variable compression to optimize the transfer of information between multiple clusters. Aside from the simple use of compression to minimize the total number of bytes sent between the two clusters, the size of the objects sent across the wire can be dynamically changed using file compression to optimize for higher throughput after considering packet loss, TCP windows, and block sizes. This includes both the packaging of multiple small files together into one larger compressed file, saving on TCP and header overhead, but also the chunking of large files into multiple smaller files that are less likely to have difficulties due to intermittent network congestion or errors. Depending on the state of the network and disks, the best size can vary; examples range from approximately 4 MB (largest non-fragmented packet using jumbo frames) to 64 MB (block size on some distributed filesystems) to 1 GB and above. A further embodiment uses forward error correction to maximize the chances that the remote end will be able to correctly reconstitute the transmission.

According to another embodiment, the improved scalable object storage system includes a distributed information synchronization system, comprising a first subsidiary node coupled to a network, the first subsidiary node including a first non-transitory computer-readable medium wherein the first computer-readable medium includes a first structured information repository, and wherein information in the first structured information repository is subject to internal consistency constraints; a second subsidiary node coupled to a network, the second subsidiary node including a second non-transitory computer-readable medium wherein the second computer-readable medium includes a second structured information repository, and wherein information in the second structured information repository is subject to internal consistency constraints; a repository synchronizer coupled to the first and second structured information repositories; the repository synchronizer further including a consistency evaluation module adapted to evaluate the differences between the first structured information repository and the second structured information repository; an internal modification module adapted to modify the internal structures of a structured information repository; an external replication module adapted to delete a target structured information repository and replace it with a replicated copy of a source structured information repository; and a threshold comparator; wherein the repository synchronizer is adapted to evaluate the first and second structured information repositories and determine a level of difference and compare the level of difference to a configurable threshold using the threshold comparator; if the level of difference is above the configurable threshold, modify the internal structures of a selected structured information repository using the internal modification module; and if the level of difference is below the configurable threshold, delete the selected structured information repository and replace it with a replicated copy of a consistent structured information repository using the external replication module.

According to another embodiment, the improved scalable object storage system includes a method for synchronizing structured information in a distributed system, comprising storing a first structured information repository on a first non-transitory computer-readable medium, wherein information in the first structured information repository is subject to internal consistency constraints; storing a second structured information repository on a second non-transitory computer-readable medium, wherein information in the second structured information repository is subject to internal consistency constraints; evaluating the differences between the first structured information repository and the second structured information repository to determine a preferred state and a difference measurement quantifying a difference from the preferred state; determining whether the difference measurement exceeds a configurable threshold; modifying a selected structured information repository if the difference measurement for the selected structured information repository is less than the configurable threshold, wherein the modification of the selected structured information repository is subject to the internal consistency constraints of the selected structured information repository, deleting the selected structured information repository if the difference measurement for the selected structured information repository is greater than the configurable threshold, and replacing the selected structured information repository with a replica of a structured information repository in the preferred state, wherein either modifying the selected structured information repository or deleting and replacing the structured information repository changes the non-transitory computer-readable medium storing the selected structured information repository such that the selected structured information repository is both compliant with its internal consistency constraints and in the preferred state. The method may also include determining that both the first structured information repository and the second structured information repository are not in the preferred state; pre-selecting the structured information repository that is closer to the preferred state and modifying the pre-selected structured information repository to bring the pre-selected structured information repository to the preferred state, subject to the internal consistency requirements of the pre-selected structured information repository, regardless of the configurable threshold.

According to another embodiment, the improved scalable object storage system includes a non-transient computer readable medium containing executable instructions, which when executed on a processor update a first structured information repository on a first non-transitory computer-readable medium, subject to internal consistency constraints; update a second structured information repository on a second non-transitory computer-readable medium, subject to internal consistency constraints; evaluate the differences between the first structured information repository and the second structured information repository to determine a preferred state and a difference measurement quantifying a difference from the preferred state; determine whether the difference measurement exceeds a configurable threshold; modify a selected structured information repository if the difference measurement for the selected structured information repository is less than the configurable threshold, subject to the internal consistency constraints of the selected structured information repository, delete the selected structured information repository if the difference measurement for the selected structured information repository is greater than the configurable threshold, and replace the selected structured information repository with a replica of a structured information repository in the preferred state.

According to another embodiment, the improved scalable object storage system includes a non-transient computer readable medium containing executable instructions, which when executed on a processor update a first structured information repository on a first non-transitory computer-readable medium, subject to internal consistency constraints; update a second structured information repository on a second non-transitory computer-readable medium, subject to internal consistency constraints; evaluate the differences between the first structured information repository and the second structured information repository to determine a preferred state and a difference measurement quantifying a difference from the preferred state; determine whether the difference measurement exceeds a configurable threshold; modify a selected structured information repository if the difference measurement for the selected structured information repository is less than the configurable threshold, subject to the internal consistency constraints of the selected structured information repository, delete the selected structured information repository if the difference measurement for the selected structured information repository is greater than the configurable threshold, and replace the selected structured information repository with a replica of a structured information repository in the preferred state.

The specifics of these embodiments as well as other embodiments are described with particularity below.

DETAILED DESCRIPTION

The following disclosure has reference to an object and file storage service delivered on top of a cloud architecture.

Figure 1:
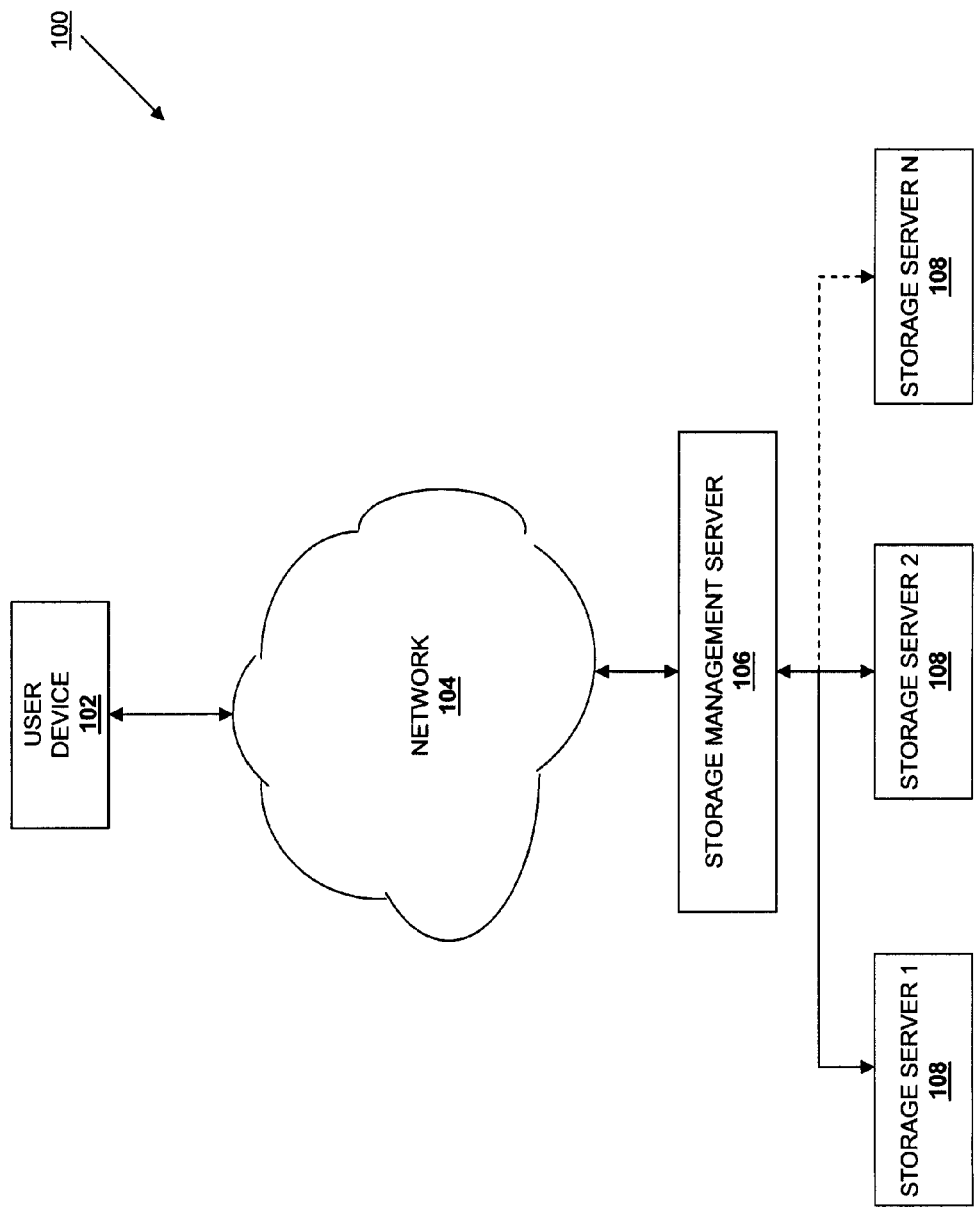
FIG. 1 is a schematic view illustrating an embodiment of a file storage system.

Referring now to FIG. 1, an embodiment of a file storage system 100 is illustrated. The file storage system 100 includes a user device 102 connected to a network 104 such as, for example, a Transport Control Protocol/Internet Protocol (TCP/IP) network (e.g., the Internet.) A storage management server 106 is connected to the network 104 and to a plurality of storage servers 108. While only one user device has been illustrated as connected to the network 104 for clarity of discussion, one of skill in the art will recognize that a plurality of user devices may, and typically will, be connected to the network 104. While only one storage management server coupled to a plurality of storage servers has been illustrated as connected to the network 104 for clarity of discussion, one of skill in the art will recognize that a plurality of storage management servers, each connected to a plurality of storage servers may, and typically will, be connected to the network 104. Each of the user device 102 and the storage management server 106 includes a respective network interface for communicating with the network 104 (e.g., outputting information to, and receiving information from, the network 104).

Each of the user device 102, storage management server 106, and the plurality of storage servers 108 may include a respective information processing system, a subsystem, or a part of a subsystem for executing processes and performing operations (e.g., processing or communicating information). An information processing system is an electronic device capable of processing, executing or otherwise handling information, such as a computer.

Figure 2:
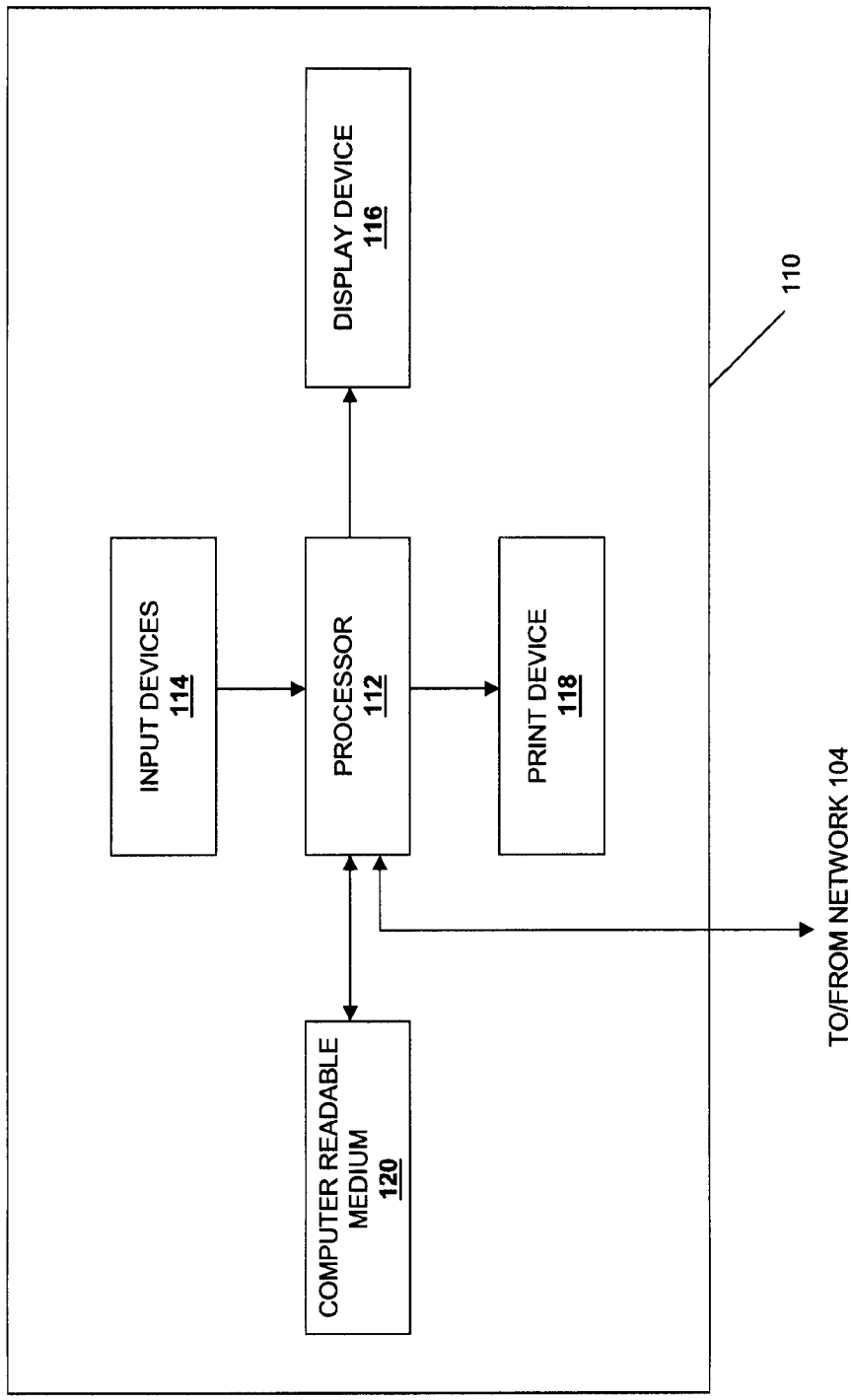
FIG. 2 is a schematic view illustrating an embodiment of an information handling system used in the file storage system of FIG. 1.

Referring now to FIG. 2, an information processing system 110 which is representative of one of, or a portion of, the information processing systems described above, is illustrated. The information processing system 110 may include any or all of the following: (a) a processor 112 for executing and otherwise processing instructions, (b) a computer-readable medium 120, which is operably coupled to the processor 114, for storing information, as discussed further below, and (f) various other electronic circuitry for performing other operations of the information processing system 110 known in the art. For example, the information processing system 110 may include a network interface (e.g., circuitry) for communicating between the processor 110 and the network 104 and/or other devices, and (b) a memory device (e.g., FLASH memory, a random access memory (RAM) device or a read-only memory (ROM) device for storing information (e.g., instructions executed by processor 112 and data operated upon by processor 112 in response to such instructions)). In some embodiments, the information processing system may also include systems suitable for in-person use, such as a one or more input devices 114, a display device 116, or a print device 118. The use of an input device 114, display device 116, or print device 118 is not necessary and should not be construed as limiting.

The computer-readable medium 120 and the processor 110 are structurally and functionally interrelated with one another as described below in further detail, and information processing system of the illustrative embodiment is structurally and functionally interrelated with a respective computer-readable medium similar to the manner in which the processor 110 is structurally and functionally interrelated with the computer-readable medium 120. As discussed above, the computer-readable medium 120 may include a hard disk drive, a memory device, and/or a variety of other computer-readable media known in the art, and when including functional descriptive material, data structures are created that define structural and functional interrelationships between such data structures and the computer-readable medium 120 (and other aspects of the system 100). Such interrelationships permit the data structures' functionality to be realized. For example, the processor 112 reads (e.g., accesses or copies) such functional descriptive material from the computer-readable medium 120 onto the memory device of the information processing system 110, and the information processing system 110 (more particularly, the processor 112) performs its operations, as described elsewhere herein, in response to such material stored in the memory device of the information processing system 110. In addition to reading such functional descriptive material from the computer-readable medium 120, the processor 112 is capable of reading such functional descriptive material from (or through) the network 104. In one embodiment, the computer-readable medium is non-transitory.

Figure 3:
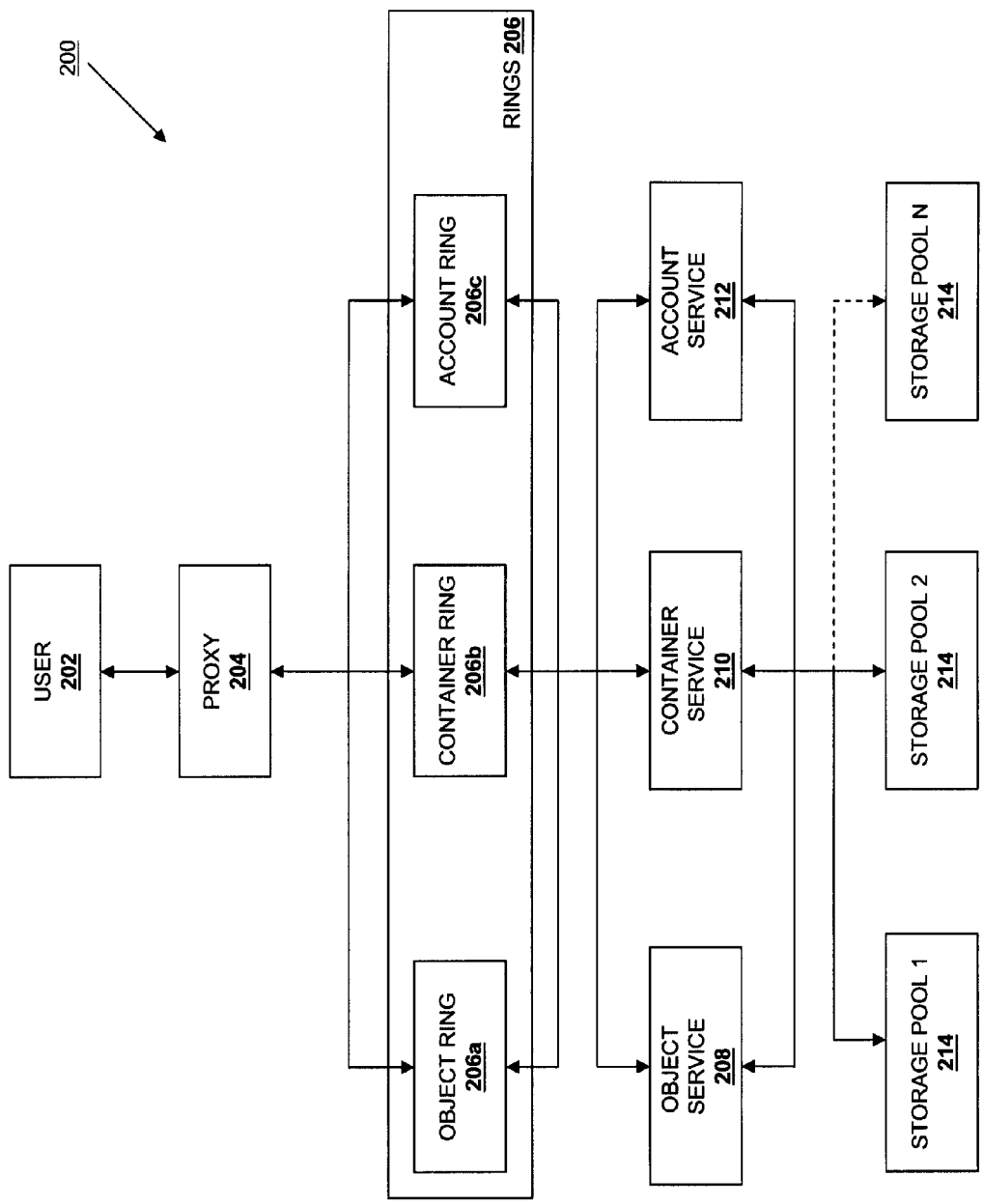
FIG. 3 is a schematic view illustrating an embodiment of a logical structure provided by the file storage system of FIG. 1.

Referring now to FIG. 1 and FIG. 3, one embodiment of the file storage system of FIGS. 1 and 2 has the logical structure 200 as shown in FIG. 3. The logical structure 200 includes a user 202 connected to a proxy 204. In one embodiment, the user 202 may be provided by the user device 102, the proxy 204 may be provided by the storage management server 106, and the user 202/proxy 204 connection may be created by the coupling of the user device 102 to the storage management server 106 through the network 104. The proxy 204 is connected to one or more rings 206 such as an object ring 206*a*, a container ring 206*b*, and an account ring 206*c*, described in further detail below, that are connected to an object service 208, container service 210, and an account service 212, respectively, described in further detail below. In other embodiments, there are other types of objects managed by rings, such as a structured data ring, a graph storage ring, or another type of ring (not pictured). In such embodiments, each ring would be connected to an appropriate service, such as a structured data service, a graph service, or another service (not pictured).

Each of object service 208, the container service 210, and the account service 212 are connected to a plurality of storage pools 214. In one embodiment, the rings 206 may include software that is stored on a computer-readable medium location in the storage management server 106 and/or the storage servers 108. In one embodiment, the object service 208, the container service 210, and the account service 212 may include software that is stored on a computer-readable medium located in the storage management server 106 and/or the storage servers 108. In one embodiment, the storage pools 208 may be provided by the storage servers 108. In one embodiment, the proxy 204/rings 206/object service 208/container service 210/account service 212/storage pool 214 connections may be created by the connection of the storage management server 106 with the storage servers 108. In a further embodiment, the rings are implemented at least in part using electrical circuits on a semiconductor chip to achieve better speed and latency.

In one embodiment, each storage pool 214 is provided by a separate storage server 108 or includes a virtual server that is included in a portion of one of the storage servers 108 or across a plurality of the storage servers 108. For example, the storage servers 108 may be physically located in one or more data centers, and the resources of the storage servers 108 may be virtualized according to the requirements of a plurality of users (e.g., the user 202) such that the plurality of storage pools 214 are provided to the plurality of users in order to store files and/or data objects. Thus, resources for a particular virtual server or storage pool may span across multiple storage servers 108.

Figure 4:
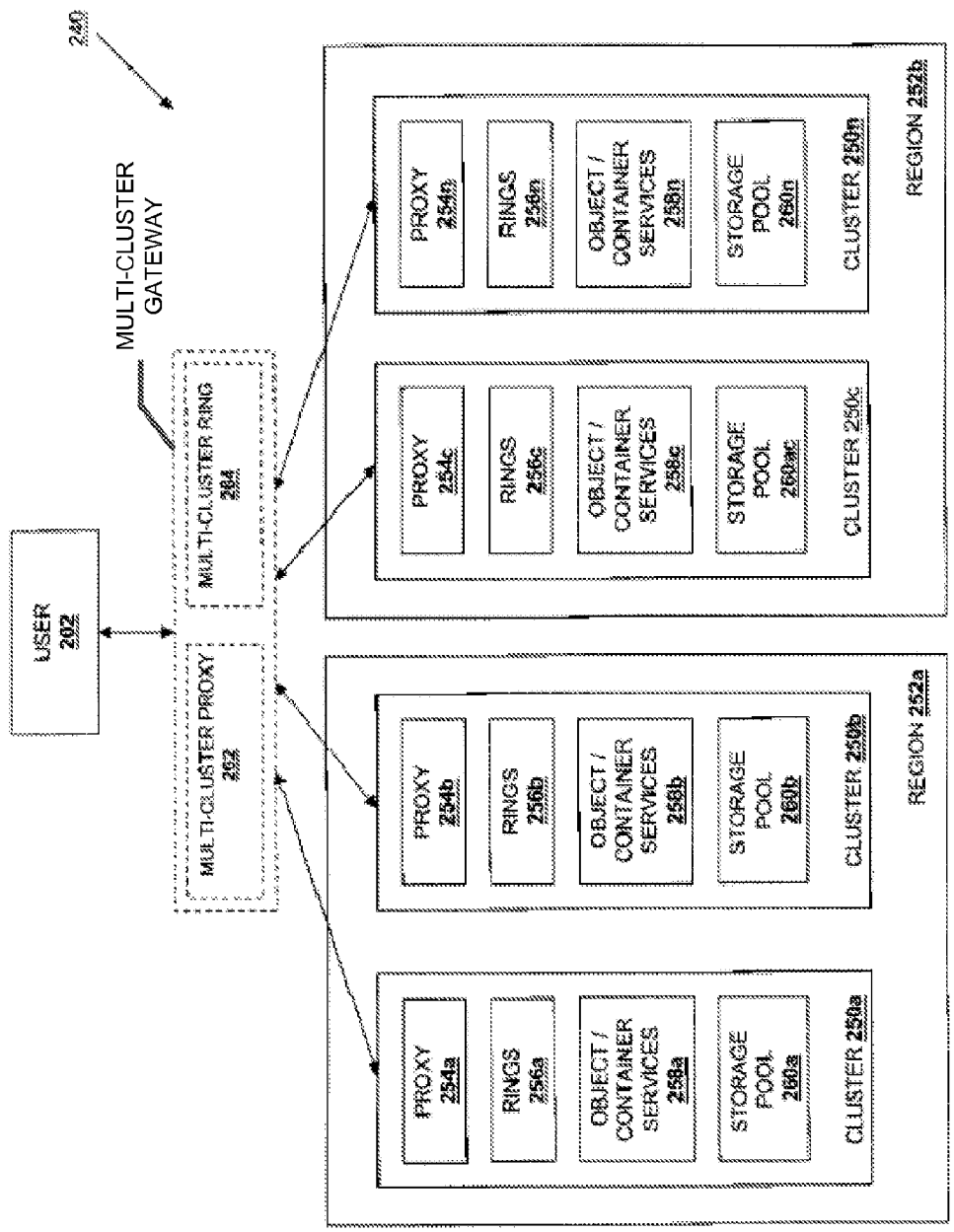
FIG. 4 a schematic view illustrating an embodiment of a logical structure provided by the multi-cluster storage system encompassing multiple similar file storage systems.

Referring now to FIG. 4, a multi-cluster file storage system is shown at reference 240. The multi-cluster file storage system 240 encompasses multiple clusters 250a-250n. These clusters may be included in separate regions, such as the exemplary regions 252a and 252b. Each cluster may also be under the control of a separate organization. Each cluster includes a file storage system, such as the file storage system described relative to FIG. 3, possibly including in each file storage system a proxy 254a-n, one or more rings 256a-n, object, container, account, or other services 258a-n, and a storage pool 260a-n. In one embodiment, the user 202 interacts with each cluster independently, addressing any requests directly to the proxies 254a-n. In a second embodiment of the multi-cluster file storage system 240, there is an additional multi-cluster proxy 262 or multi-cluster ring 264. The multi-cluster proxy 262 is used to provide a single entry point to the clusters 250a-n, and the multi-cluster ring 264 is used to balance requests across the clusters 250a-n. An embodiment may use either a multi-cluster proxy 262, or a multi-cluster ring 264, or both, or neither. In an embodiment in which a multi-cluster proxy 262 or a multi-cluster ring 264 is used, the individual clusters 250a-n can optionally forego the use of the cluster-specific proxy 254a-n or cluster-specific ring 256a-n.

Figure 5:
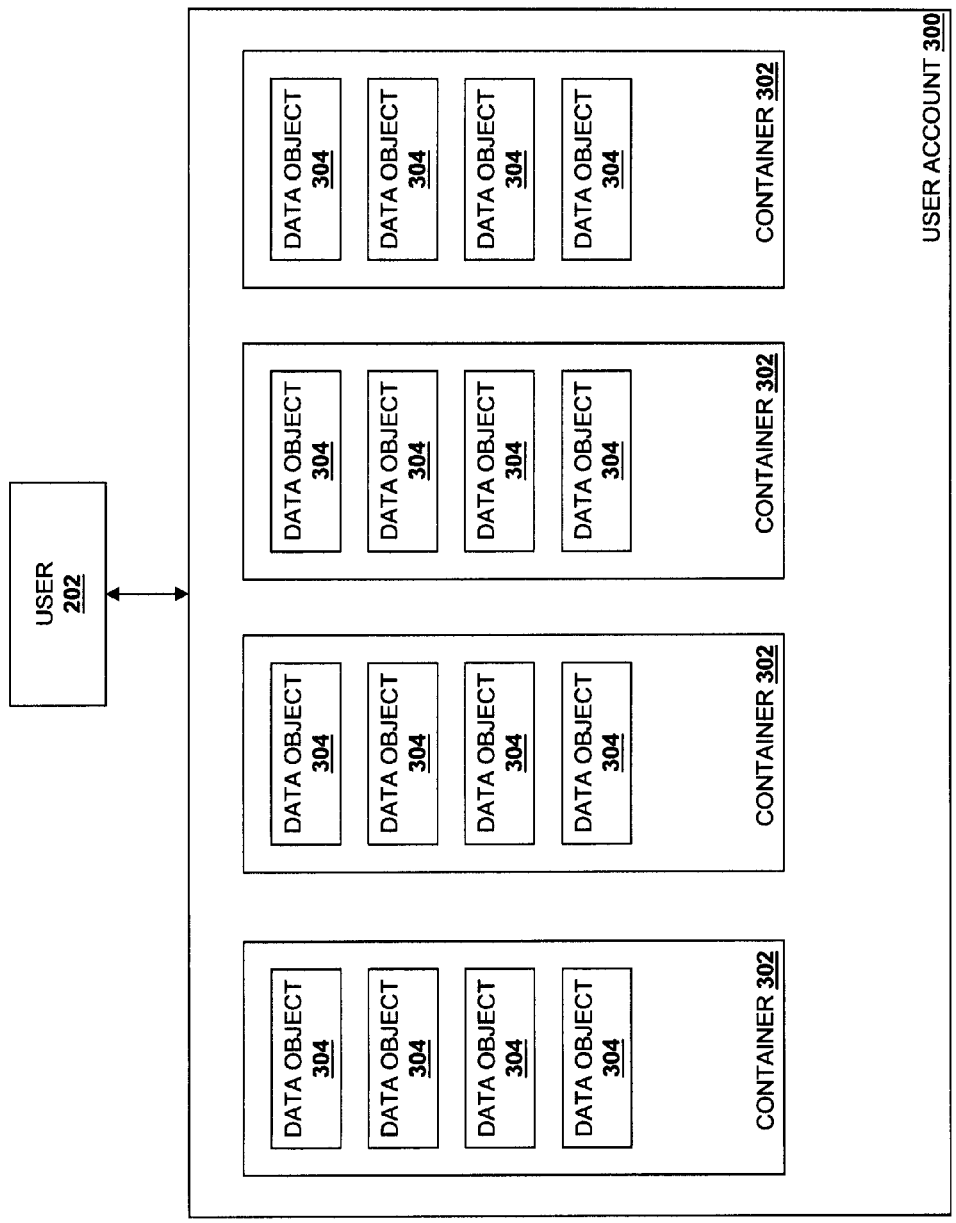
FIG. 5 is a schematic view illustrating an embodiment of a user account.

Referring now to FIG. 5, the user 202, which is exemplary of a plurality of users that use the file storage system 100, has a user account 300 with the file storage system 100 to store and receive data objects, and that user 202 may create a plurality of containers 302 in the user account 300 and store a plurality of data objects 304 in each of the containers 302 for retrieval. In the discussion below, a user account is referred to as an "account," a container is referred to as a "container," and a data object is referred to as an "object" for clarity of discussion. One of skill in the art will recognize that the terms "account," "container" and "object" are generic forms of data naming that are used to direct the file storage system 100 to a specific data object. When other types of rings and services are used, an appropriate name may be substituted. For clarity, discussion of alternative rings and services will be limited to the "account," "container" and "object" rings and services.

The account as shown in FIG. 5, as well as other rings and services, are consistent whether or not they are deployed on a logical structure within a single cluster, such as the structure illustrated in FIG. 3, or are arrayed across a multi-cluster system, such as the structure illustrated in FIG. 4. When reference is made to the proxy 204, the rings 206, the services 208, 210, or 212, or the storage pools 214, equivalent structures are also contemplated within each cluster 250a-n (specifically the proxies 254a-n, the rings 256a-n, the object/container services 258a-n, and the storage pools 260a-n). Similarly, equivalent structures to the proxy 204 and the rings 206 are contemplated relative to the multi-cluster proxy 262 and the multi-cluster ring 264.

The components of the exemplary file storage system 100 and some of their functions will now be described in detail relative to various embodiments.

The Rings 206

As discussed above, the rings 206 are implemented in a tailored electrical circuit or as software instructions to be used in conjunction with a processor to create a hardware-software combination that implements the specific functionality described herein. To the extent that software is used to implement the rings, it may include software that is stored on a computer-readable medium location in the storage management server 106 and/or the storage servers 108. Referring back to FIG. 2, the rings 206 include semiconductor circuits and/or computer-executable instructions that, when executed by a processor, provide subsystems of the file storage system 100 that provide a mapping between the entities stored in the file storage system 100 and the locations of those entities in the storage pools 214. In the illustrated embodiment, the file storage system 100 includes a separate object ring 206a, container ring 206b, and account ring 206c, and when components of the file storage system 100 need to perform any operation on an object, container, or account, those components interact with the object ring 206a, container ring 206b, and account ring 206c, respectively, to determine the location of that stored entity in the storage pools 214. However, one of skill in the art will recognize that different ring structures may be provided (e.g., a single ring for the objects, containers, and accounts, more than one ring for each of the objects, containers, and account, etc.) without departing from the scope of the present disclosure. The rings 206 maintain the availability and safety of data in the file storage system 100 through the use of zones, partitions, replicas, and the storage pools 214, as described below.

A zone is defined as one or more of the storage pools 214 that are subject to a correlated loss of access or data as a result of a particular event. For example, each storage server 108 in the file storage system 100 may be defined as a storage pool in a separate zone, as each storage server 108 is subject to loss of access to its stored objects as a result of a storage device failure, a catastrophic event at the location where the storage server resides, and/or a variety of other object access-loss scenarios known in the art. For the same reasons, a drive in a storage server 108 may be defined as a storage pool in a separate zone, a plurality of storage servers 108 in a given storage rack or cabinet as a storage pool in a separate zone, a plurality of storage servers 108 coupled to the same switch as a storage pool in a separate zone, a plurality of storage servers 108 in a given datacenter as a storage pool in a separate zone, a plurality of storage servers 108 connected to a common power system as a storage pool in a separate zone, etc. One of skill in the art will recognize that the examples of zones provided above are not limiting, and a variety of zones known in the art will fall into the scope of the present disclosure.

Logically, a partition is an abstract storage bucket. As discussed in further detail below, the file storage system 100 maps each partition to a plurality of storage pools 214 that are in different zones, and stores data using those partitions. The mapping of a given partition to a plurality of storage pools 214 creates a plurality of partition replicas of that partition (e.g., equal to the number of storage pools 214 the partition is mapped to.) For example, when a given partition is mapped to 3 storage pools 214 that are in different zones, 3 partition replicas of that partition are created.

The object ring 206a for the management of objects will be described in detail below. However, one of skill in the art will recognize how the discussion may be applied to the container ring 206b, the account ring 206c, and/or a ring for any other stored entity, without departing from the scope of the present disclosure.

In various replicated, network-based file storage systems, an object from a user is received by a proxy. To determine where the object should be stored, some attribute of the object or the object data itself is hashed. If necessary, some attribute of the object is modified so that three different results are returned from the hashing function. The object is then replicated and stored in the storage pool corresponding to the number returned by the hash function.

Under typical circumstances, a consistent hashing function is used as the hash function. The use of the consistent hashing function ensures that there will be minimal changes to the assigned storage pools given a change in membership due to adding or removing new storage pools.

Although the consistent hashing function results in minimal changes to the storage location, sometimes the assignments made by the consistent hashing function or the rearrangements needed due to a change in membership may have undesirable storage characteristics. For example, such methods have been found to result in multiple object replicas for the same object being stored in one or more storage pools that are in the same zone. As discussed above, this is undesirable because then multiple (and possibly all) object replicas for the same object are subject to being lost as a result of a particular event. Alternatively, rebalancing the replicas due to a change in membership has been found to require the movement to two of the replicas 4% of the time, and the movement of all three replicas 1% of the time. It is desirable to never have to move more than one replica at a time.

Figure 6:
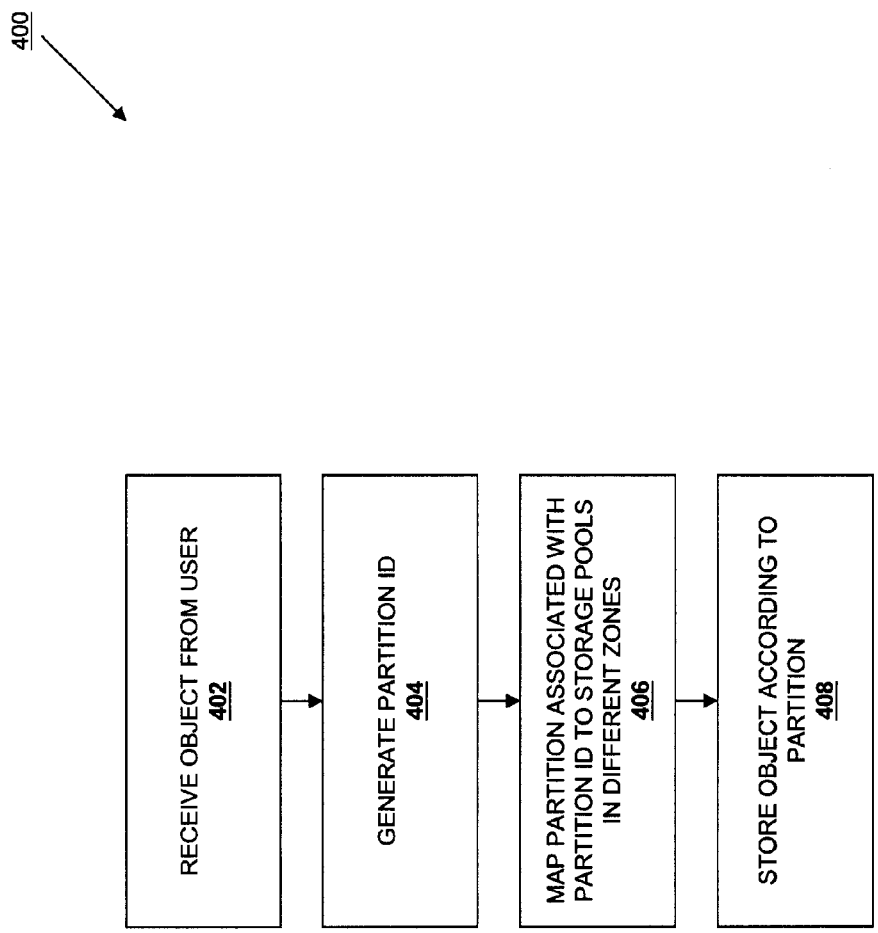
FIG. 6 is a flow chart illustrating an embodiment of a method for storing an object.

In one embodiment, the file storage system 100 solves the problem of multiple object replicas for the same object being stored in storage pools that are in the same zone through the use of the rings 206. Referring now to FIG. 6, a method 400 for storing stored entities is illustrated. At block 402, an object us received by a user. In one embodiment, an object is received from the user 202 by the proxy 204. The method 400 then proceeds to block 404 where a partition identification is generated. In one embodiment, a consistent hash function is applied to the object received in block 402, and the hash function returns a partition identification that corresponds to a partition. The method 400 then proceeds to block 406 where the partition associated with the partition identification is mapped to storage pools that are in different zones. This mapping function is constrained so that the physical location of the storage pools is required to have one or more desirable properties, such as having each partition replica in a separate zone.

There are various embodiments of the constrained mapping function. In one embodiment, the constrained mapping function is the output of a constraint satisfaction solver, in which the desired storage characteristics (such as the requirement that each replica of a partition be in a different availability zone) are inputs to the solving function. The solver then uses one or more search methodologies within the solution space to find a storage layout that maps partitions to storage pools in a desirable manner.

In a second embodiment, a constrained mapping function is applied to portions of the partition identification (e.g., the portions of the partition identification that the constrained mapping function is applied to) may be bits of the output of the original hashing function is applied to the object. For example, the number of bits to which the constrained mapping function is applied may be known as the partition power, and 2 to the partition power may indicate the partition count. The constrained mapping function is designed to return a storage pool location for each portion of the partition identification to which it is applied, and the storage pool locations returned for a given partition identification will each correspond to storage pools 214 in different zones. These storage pool locations are then associated with the partition identification. Thus, the partition corresponding to the partition identification is replicated multiple times in the file storage system 100 (i.e., a partition replica is included in each storage pool corresponding to the storage pool locations determined from the constrained mapping function.) The method 400 then proceeds to block 408 where the object is stored according to the partition. The object received by the user 202 in block 402 of the method 400 may then be stored according to the partition corresponding to the partition identification, which results in multiple object replicas for the object being stored in storage pools that are in different zones in the file storage system 100. In another embodiment, the constrained mapping function is used to determined storage pool locations that are in different zones for each partition prior to the object being received by the user 202, discussed in further detail below.

The output of the constrained mapping function signifies a particular storage pool where a replica of the partition should be stored. An example of this output is as follows: When an object is received from the user 202 at block 402 of the method 400, and at block 404 of the method 400, a hash function is applied to the object. In one exemplary embodiment, the user 202 provides data including an account/container/object name to the proxy 204, and a hash function is applied to the account/container/object name as follows:

Hash function (account/container/object name)== 123456789

Where 123456789 is the partition identification that is returned by the hash function. At block 406 of the method 400, the partition mapping number may then be divided into 3 parts (e.g., the first three digits, the second three digits, and the third three digits of the partition identification,) and the constrained mapping function is applied to each of those parts:

Constrained mapping function (123)==storage pool location (zone 1)

Constrained mapping function (456)==storage pool location (zone 7)

Constrained mapping function (789)==storage pool location (zone 3)

As discussed above, the constrained mapping function is designed to return the storage pool location (zone 1), storage pool location (zone 7), and storage pool location (zone 3) that correspond to storage pools that are in different zones (e.g., zones 1, 3, and 7). The storage pools locations are then associated with the partition identification:

Partition identification: (storage pool location (zone 1), storage pool location (zone 7), storage pool location (zone 3)

Thus, the partition corresponding to the partition identification is replicated across storage pools that are in different zones (here, zones 1, 3, and 7.) At block 408 of the method 400, the object received from the user 202 is then stored, using the partition corresponding to the partition identification, in each of the storage pools corresponding to the storage pool locations returned by the application of the constrained mapping function to portions of the partition identification. Thus, 3 replicas of the object received from the user 202 are stored in the file storage system 100 in storage pools that are located in different zones (zones 1, 3, and 7.) In one embodiment, each of the storage pool locations are IP addresses, i.e., when each of the storage pools are separate storage servers. In one embodiment, the constrained mapping function is a hash function. However, one of skill in the art will recognize that a variety of functions may be used to ensure that each partition is mapped to storage pools that are in different zones without departing from the scope of the present disclosure.

In another embodiment, the constrained mapping function is applied to the file storage system 100 before the object is received by the user 202 at block 402 in order to accomplish the mapping of the partitions to storage pools described above with reference to block 406 of the method 400. For example, the total number of partitions and the total number of storage servers/storage pools in the file storage system 100 may (and typically will) be known. With that knowledge, the constrained mapping function is used to map each partition in the file storage system 100 to a plurality of storage pools that are in different zones, and that information is stored in a constrained mapping database. For example, a constrained mapping database may include partitions mapped to storage pools such as:

Partition 1: storage pool location (zone 1), storage pool location (zone 2), storage pool location (zone 3)
Partition 2: storage pool location (zone 4), storage pool location (zone 5), storage pool location (zone 6)
Partition 3: storage pool location (zone 7), storage pool location (zone 8), storage pool location (zone 9)
In one embodiment, the output of the constrained mapping function can be saved for optimized lookup. For example, the saved output may be embodied in a file provided to each of the storage pools 214, or stored in a database that is available for the appropriate systems to query. If the saved output is contained within a file, the storage pools 214 may then periodically check the modification time of this file and reload their in-memory copies of the ring structure as needed.

Thus, when an object is received from a user 202 at block 402, the hash function is applied to that object to get the partition identification (e.g., partition 1, 2, or 3 in the example above) at block 404, and then at block 406, the partition identification may then be used with the constrained mapping database to determine the corresponding partition and its associated storage pool locations. This embodiment allows the processing necessary to map partitions to multiple storage pools in different zones to be conducted before objects are received from users so that such processing does not have to be conducted each time an object is received from a user.

Figure 7:
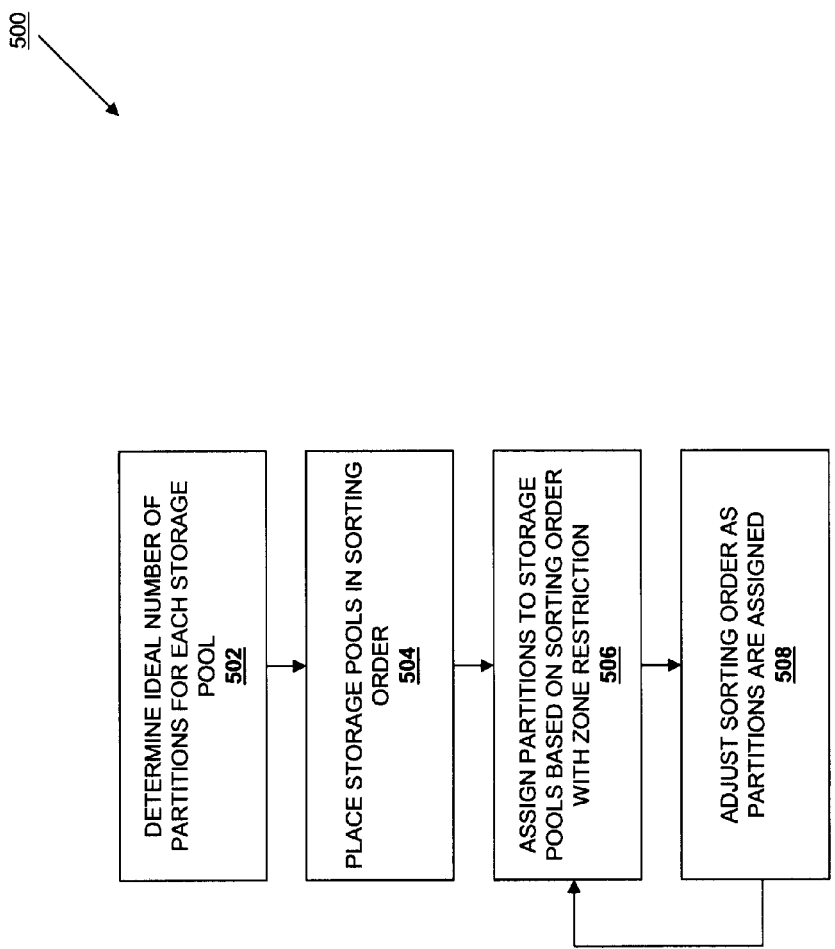
FIG. 7 is a flow chart illustrating an embodiment of a method for creating a ring.

For example, referring now to FIG. 7, a method for building a ring 206 is illustrated. At block 502, an ideal number of partitions for each storage pool in the file storage system is determined. In one embodiment, the number of partitions that should ideally be assigned to each storage pool 214 is calculated based the weight (e.g., storage capacity) of each storage pool 214. For example, if the partition power is 20, the ring 206 will have 1,048,576 ($2^{20}$) partitions. If there are 1,000 storage pools 214 of equal weight, each storage pool 214 will ideally be assigned 1,048.576 partitions. This may be referred to as an ideal partition count, and in the example, each storage pool 214 starts off empty with a 1,048.576 ideal partition count. The method 500 then proceeds to block 504 where the storage pools are placed in a sorting order. In one embodiment, the storage pools 214 are placed in a sorting order based on their ideal partition count (e.g., highest to lowest), and this sorting order is maintained throughout the method 500 as partitions are assigned storage pools 214. The method 500 then proceeds to block 506 where partitions are assigned to storage pools based on their sorting order but with a zone restriction. In one embodiment, the partitions are assigned to the storage pool 214 with the highest ideal partition count, but subject to the restriction that the storage pool 214 to which a partition is being assigned is not in the same zone as any other storage pool 214 that includes a partition replica for that same partition. The method 500 then proceeds to block 508 where the sorting order of the storage pools is adjusted. In one embodiment, once a partition is assigned to a storage pool 214, that storage pool 214 will have its ideal partition count decremented and thus that storage pool 214 is moved to a lower position in the sorting order, and the method 500 then returns to block 506 to continue to assign partitions to storage pools based on their sorting order but with the zone restriction. In such a manner, each partition is assigned multiple storage pools 214 in different zones, and thus objects received from users may have multiple object replicas stored in storage pools in different zones simply by associating those objects with the partitions.

As mentioned above, another problem relates to the rebalancing of object replicas stored in the file storage system due to changing membership (i.e., adding or subtracting storage servers or storage pools from the file storage system.) Such methods have been found to require the moving of multiple object replicas of the same object in response to a membership change, which is undesirable.

In one embodiment, the mapping of partitions to multiple storage pools in different zones in the file storage system 100 described above solves these problems. The use of the constrained mapping function to ensure that each partition is mapped to storage pools in different zones ensures that object replicas for the same object are never located in storage pools 214 that are in the same zone (i.e., because any given object received from a user is stored in a partition that is replicated in storage pools that are in different zones.) For example, with each storage server 108 defined as a separate zone, the addition or subtraction of a given storage server 108 from the file storage system 100 thus can only effect one partition replica, and hence one object replica of a given object (i.e., because only one of the partition replica will ever be located on a storage server that is defined as a separate zone.) In similar fashion, the rebalancing associated with changing the zone membership can be accomplished without affecting more than one replica because each zone is guaranteed to only contain one replica of a given partition.

Figure 8:
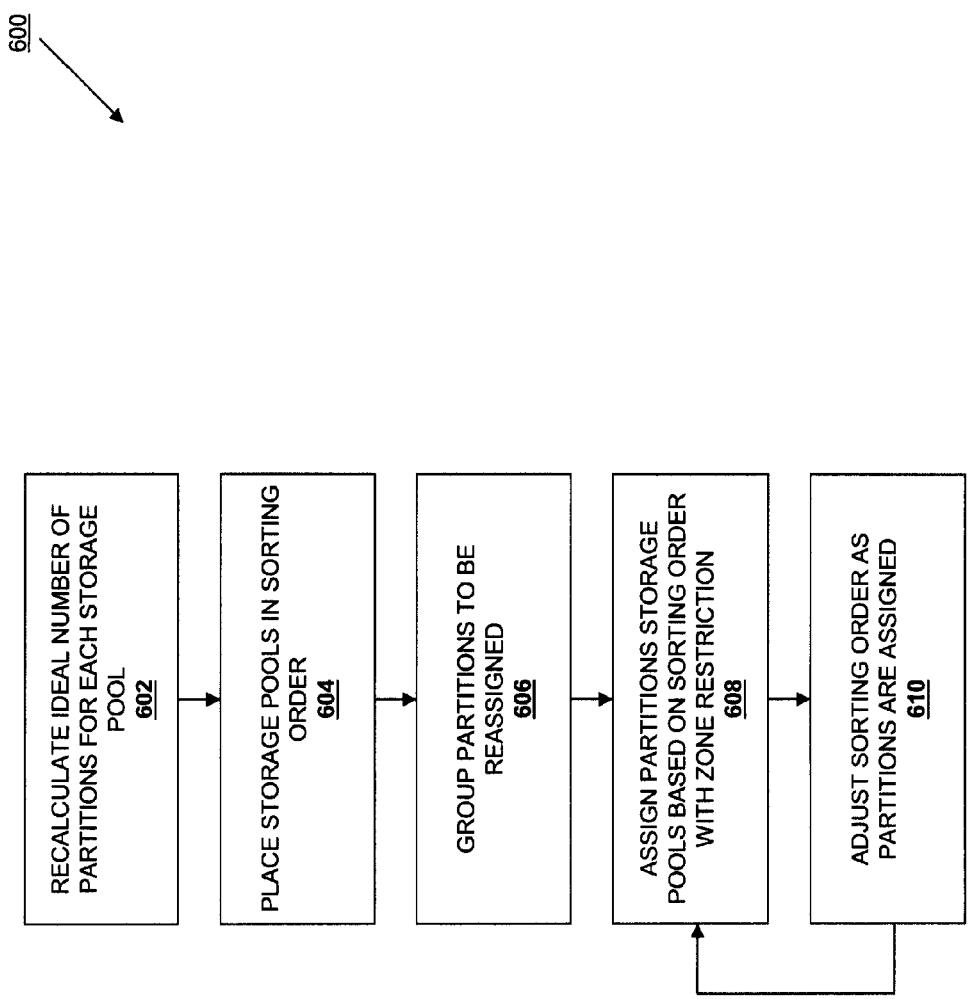
FIG. 8 is a flow chart illustrating an embodiment of a method for reassigning partitions in a ring.

Periodically, partitions may need to be reassigned to different storage pools 214, and the reassignment of partitions will result in the building of a new ring from an old ring. Such an event may occur due to the removal and/or addition of a storage pool 214 from the file storage system 100 (e.g., a membership change.) Referring now to FIG. 8, a method 600 for reassigning partitions in response to the removal of a storage pool is illustrated. The method 600 begins at block 602 where the ideal number of partitions for each storage pool is recalculated. In one embodiment, the ideal partition count for the storage pools 214 remaining in the file storage system 100 (subsequent to the removal of a storage pool) is recalculated. The method 600 then proceeds to block 604 where the storage pools are placed in a sorting order as described above with reference to block 504 of the method 500. The method then proceeds to block 606 where partitions to be reassigned are grouped. In one embodiment, a partition list for the partitions to be reassigned is created. For example, any storage pools 214 that have been removed from the filesystem 100 may have all their assigned partitions unassigned and added to the partition list, and any storage pools 214 that have more partitions than their ideal partition count may have random partitions unassigned from them and added to the partition list (i.e., such that those storage pools have a number of partitions that is within a predetermined amount of their ideal partition count.) The partitions on the partition list may then be reassigned to the storage pool 214 in blocks 608 and 610 of the method 600 substantially as discussed above with reference to blocks 506 and 508 of the method 500. In one embodiment, at block 608 of the method 600, whenever a partition is reassigned to a storage pool 214, the time of the reassignment is recorded. Reassignment times may be used when gathering partitions to reassign to storage pools 214, such that no partition replica for a given partition is moved twice in a predetermined amount of time. However, such reassignment restrictions based on reassignment times may be ignored for partition replicas on storage pools 214 that have been removed from the file storage system 100, as removing a storage pool 214 only happens upon storage pool 214/storage server 108 failure and thus requires the reassignment of the partitions.

In one embodiment, the method 600 is conducted periodically to help balance the amount of data stored by storage pools 214 in the file storage system 100. For example, the partition reassignment method 600 discussed above may repeated until each storage pool 214 is within a predetermined threshold of a predetermined storage capacity (e.g., within 1% of 60% storage capacity for that storage pool) or when it is determined that partition reassignment will not improve the balance of data stored by the file storage system 100 by more than a predetermined amount. For example, if a first storage server 108 includes 2TB of storage, a second storage server 108 includes 4TB of storage, and a third storage server 108 includes 6TB of storage, data balancing may be conducted to ensure that each of the storage servers 108 holds the same percentage of its storage capacity (i.e., the first storage server 108 holds 0.66TB of data, the second storage server 108 holds 1.33TB of data, and the third storage server 108 holds 2TB of data such that each of the storage servers 108 is at 33% of its storage capacity.) Weights may be applied to storage servers 108 to balance the distribution of data on the storage servers 108 in the file storage system 100 to account for different storage capacities.

Object Service 208

As discussed above, the object service 208 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108. The object service 208 may include instructions that, when executed by a processor, provide object storage and objection manipulation functionality such that the object service 208 is operable to, for example, store, retrieve and delete stored objects in the storage pools 214. In one embodiment, an object service 208 is provided for each storage pool that holds object data. For example, an object service 208 may be included on a server that further includes one or more storage drives that provide a storage pool for objects. In one embodiment, the objects are stored as binary files with metadata stored as extended attributes of the file in the filesystem used by the object storage service. In such an embodiment, the object service 208 will uses the extended attributes of the filesystem to manage the metadata. In a second embodiment, the metadata is stored in a machine-readable format next to the data itself. For example, the metadata for a file is stored in a text file or single file database.

In one embodiment, objects are stored by the object service 208 using a path derived by applying a hash function to the name of the object along with a timestamp. For example, an incoming object for a user account to be written to a container will have a hash applied to its account/container/object name and the path generated for the object is: /objects/<partition>/<storage pool location>/objectname_hash.15673.data where "objects" indicate that the object data is stored in an object storage pool 214, <partition> is the partition identification that maps the object to a partition, <storage pool location> is the storage pool location that maps the partition replica to a storage pool 214 in a different zone than its related partition replicas, objectname_hash is the hash of the account/container/object name, and 15672 is the timestamp.

When there is a request for an object, the file storage system 100 will find all the object replicas in the file storage system 100 that include the objectname_hash and return the object data that has the most recent timestamp value. Special care is needed to record updates that should be persisted as the new canonical value. For example, when an object replica is deleted, a modification sentinel (e.g., a 0 byte "tombstone" file or ".ts" file) is written to the storage pool 214 where the deleted object replica was located and that includes the same objectname_hash as the deleted object replica (i.e., /objectname_hash.15784.ts,) and that tombstone file stays in the file storage system 100 for a predetermined amount of time (e.g., 7 days.) During object replication, discussed in further detail below, when the file storage system 100 encounters a tombstone file, the file storage system 100 checks whether the tombstone file has been in the system for 7 days. If not, the file storage system 100 searches for and deletes any object replicas that it finds related to that tombstone file (e.g., replicas that same objectname_hash as the tombstone file) to ensure that objects that were meant to be deleted from the file storage system 100 are removed and older versions of object replicas of a given object do not appear in the file storage system 100 due to, for example, the temporary failure of a storage server 108 or storage pool 214 that might have prevented the deletion of that object replica previously. If the file storage system 100 determines that a tombstone file has been in the file storage system 100 for longer than the predetermined time, that tombstone file is deleted.

The mechanism used for recording file deletion is also used to record other types of updates. For example, a "purge" marker indicates that the system should overwrite all copies of the object and set the space to free; a "version" marker indicates that the system should create a copy and mark the copy with a version number; and a "ttl" (time-to-live) marker indicates that the system should check an authoritative source for updates after the expiry of a set time period. Other types of out-of-band changes to the file are also contemplated.

Container Service 210

As discussed above, the container service 210 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108. The container service 210 may include instructions that, when executed by a processor, provide container storage and container manipulation functionality such that the container service 210 is operable to store, retrieve and delete stored containers in the storage pools 214. In one embodiment, a container service 210 is provided for each storage pool that holds container data. For example, a container service 210 may be included on a server that further includes one or more storage drives that provide a storage pool for containers, and the container service 210 may include the names of containers and objects in those containers. Thus, in one embodiment, the container service 210 handles the listing of containers, and does not hold the location where the objects are stored (e.g., the storage pool where a given object replica resides), but rather the locations of containers that hold the objects. The listings for the container locations may be stored as database files, and those listings may be replicated across the storage pools 214 in a manner that is similar to the replication of objects (e.g., through their association with partitions) as discussed above. Container storage statistics for the container service(s) 210 may be tracked by the file storage system 100 and may include total number of objects stored by one or more containers, the total storage provided by any given container, and/or a variety of other statistics known in the art.

Account Service 212

As discussed above, the account service 212 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108. The account service 212 may include instructions that, when executed by a processor, provide account storage and account manipulation functionality such that the account service 212 is operable to store, retrieve and delete stored accounts in the storage pools 214. In one embodiment, an account service 212 is provided for each storage pool that holds account data. For example, an account service 212 may be implemented by a server that includes storage drives that provide a storage pool for accounts, and the account service 212 may include the names of accounts and containers in those accounts. Thus, the account service 212 is very similar to the container service 210, discussed above, with the exception that account storage 212 handles the listings of accounts.

Other Services

As discussed above, other types of services may be implemented in similar fashion to the object, container, and account services described above. For example, one implementation includes an authorization service. The authorization service may include instructions that, when executed by a processor, handle the storage and manipulation of authorization metadata so that the authorization service is operable to store, retrieve, delete, and query stored credentials from in the storage pools 214. In one embodiment, an authorization service provides an ACL-based authorization. In a second embodiment, the authorization service provides posix-compatible authorization. In a third embodiment, the authorization service provides tree or graph-based authorization, such as would be provided with an LDAP-based authorization service.

A second implementation includes a structured data service. The structured data service may include instructions that, when executed by a processor, provide the storage and manipulation of structured data such that the structured data service is operable to store, retrieve, delete, and query tabular, graph, or tree-based data from in the storage pools 214. In one embodiment, a structured data service provides a JSON-based output. In a second embodiment, the structured data service provides XML-based output. In a third embodiment, the structured data service provides HTML output.

Proxy 204

The proxy 204 is implemented in a tailored electrical circuit or as software instructions to be used in conjunction with a processor to create a hardware-software combination that implements the specific functionality described herein. The proxy 204 is responsible for tying together the file storage system 100. For each request received from a user, the proxy 204 determines the location of the account, container, or object in the appropriate ring 206 (e.g., the object ring 206*a*, the container ring 206*b*, or the account ring 206*c*,) and routes the request accordingly. A public Application Programming Interface (API) may be exposed to users through the proxy 204. A large number of failures may be handled by the proxy 204. For example, if a storage server 108 and/or storage pool 214 is unavailable for an object PUT, the proxy 204 may use the rings 206 to determine an appropriate storage server 108 and/or storage pool 214 for that object and route the object there instead. In one embodiment, when objects are streamed to or from a storage server 108, they are streamed directly through the proxy 204 and proxy server 106 to or from the user 202 and/or user device 102, and are not spooled by the proxy 204 and the proxy server 106.

In another embodiment, there are multiple proxies associated with a file storage service. The existence of multiple proxies may be ascertainable from outside the file storage service, or it may be transparent. Different proxies may be used for different purposes. For example, in one embodiment different proxies are used for different types of files. In another embodiment, different proxies are used for different types of requests. In a third embodiment, an appropriate proxy is chosen to minimize latency, geographic, or network distance between the proxy and the system making the request.

In the context of a multi-cluster system such as the system described in FIG. 4, the multiple proxies may be used to provide a single point of entry for the multi-cluster system, in addition to one or more proxies at the per-cluster level.

In one embodiment, one of the functions performed by the proxy is time-stamping or logging all requests into the storage system. The timestamps on the incoming requests are stored as metadata and are used in part to determine the most recent version of a file.

In an embodiment with more than one proxy, it is possible for more than one request to come in within a short period of time. In that case, it is important to resolve any conflicts associated with multiple simultaneous accesses to the file storage system. In one embodiment, an algorithmic approach for ordering the actions of different independent actors is used, such as the use of a vector clock. In a second embodiment, an independent arbiter is used to resolve conflicts, using an implementation of the Paxos algorithm or the Byzantine Generals algorithm.

A third embodiment may also be used to simplify and increase the speed of the system by reducing the applicable error window and then algorithmically picking a "winner" in the case of multiple conflicting accesses within the error window. For example, an embodiment may use a time synchronization server and time synchronization code to reduce the clock skew between different computers in a pool, in a zone, or across zones to within a specified E, for example one millisecond or one microsecond. The applicable ϵ can be determined by analyzing the pattern of accesses over time, and it may be different for different accounts, different types of services, or at different times. In this case, the algorithmic complexity of absolutely ordering the actions across the cluster is traded for the operational complexity of handling time synchronization across the system.

Given the clock synchronization across the pools or zones within ϵ, the previously-discussed timestamp will be sufficient to absolutely order the actions of other systems interacting with the file storage system if there are not multiple conflicting accesses to the same stored value within c. In that case, the timestamping is used to order the actions and pick the most recent version of any information or data.

If there are multiple conflicting accesses within ϵ, then the system includes a synchronization rectifier that algorithmically breaks the tie and chooses a winner. In one embodiment, this is handled by asserting that the first copy to replicate (as further discussed below) wins. In a second embodiment, the inconsistency is handled by throwing an error for manual intervention. In a third embodiment, the inconsistency is handled by examining one or more additional types of metadata, such as latency to the originating user (given identical arrival times, the originating server with lower latency issued second), internal file modification or creation times, or an arbitrary ordering on an unrelated value. A fourth embodiment uses geolocation on the requesting IP address and allowing the request that is geographically closer to the timestamping gateway. A fifth embodiment detects the attempted simultaneous access and does not allow any write, instead returning an error in response to both requests. A sixth embodiment evaluates the requests to see if they can be merged and both accesses granted.

In the context of a multi-cluster system such as the system described in FIG. 4, the latency between clusters is much more likely to be higher. This can be dealt with by increasing £ or by only synchronizing accesses within a single cluster.

Replicators

Replicators are implemented in a tailored electrical circuit or as software instructions to be used in conjunction with a processor to create a hardware-software combination that implements the specific functionality described herein. To the extent that one embodiment includes computer-executable instructions, those instructions may be implemented as software stored on a computer-readable medium located in the storage management server 106 and/or the storage servers 108, and may include instructions that, when executed by a processor, keep the file storage system 100 in a consistent state in the face of temporary error conditions like network outages, storage pool 214 failure, and/or storage server 108 failure. For example, an object replicator may be provided for each storage pool 214 (e.g., a storage server 108 that provides a storage pool) that holds object data. The replicators compare stored entities in their storage pool 214 with each replica of that stored entity in other storage pools 214 in the file storage system 100 to ensure that all related replicas contain the latest version of the stored entity. In one embodiment, object replicators may use a hash list to quickly compare subsections of partitions, while container replicators and account replicators may use a combination of hashes and shared storage account metadata. In one embodiment, replicator updates of stored entities are push based. For example, replicators may compare the replica stored entities in their storage pools 214 with related replica stored entities in other storage pools in the file storage system 100, and if the replicator determines there is a difference between the replicas (e.g., by applying an order independent check sum to the related replicas), the replicator may then push the data that related replica stored entities in other storage pools need in order to be up to date. In one embodiment, the pushed updates include rsyncing replicas to efficiently provide only the data needed by the out-of-date replica. Account and container replicators may either push missing data over HTTP or rsync whole database files in the event it is determined that a push update will be inefficient. The push-based updates discussed above results in replicas being updated generally only from "local" storage pools 214 to "remote" storage pools 214. In one embodiment, this provides a benefit as data in a storage pool 214 may not belong there (as in the case of handoffs and ring changes), and a replicator can't know what data exists elsewhere in the file storage system 100 that it should pull in. Thus, it's the duty of any replicator associated with a given a storage pool 214 that contains data to ensure that data gets to other storage pools where it belongs. As discussed above, replicators may also ensure that data is removed from the system by creating the tombstone files as the latest version of a replica when that replica is deleted, and then search out and removing all replicas related to that tombstone file from the file storage system 100.

Database Replicators

Database replicators are a type of replicator, discussed above, that operate on storage pools 214 that contain accounts or containers (i.e., there may be account replicators and container replicators.) To perform the replication discussed above, the first step that a database replicator may perform may be a low-cost hash comparison to find out whether or not two replicas (e.g., a replica on the database replicators local storage pool 214 and a related replica on a "remote" storage pool 214) already match. Under normal operation, the hash comparison allows relatively quick verification that databases in the file storage system 100 are already synchronized. If the hashes differ, the database replicator may bring the databases in sync by sharing records added since the most recent previous sync point. This most recent previous sync point notes the last record at which two databases were known to be in sync. After all new records have been pushed to the remote database, the sync table (which lists which remote databases a local database is in sync with) of the local database is pushed to the remote database, so the remote database knows it's now in sync with database that the local database has previously synchronized with. If a database replica (e.g., an account replica or container replica) is found to be missing entirely from a storage pool 214 that it should exist in, the entire local database file may be recreated on that storage pool 214 using rsync techniques known in the art. In one embodiment, when an entire local database file is be recreated on a storage pool 214 using rsync, that database may be vested with a new unique id.

Object Replicator

Object replicators are a type of replicator, discussed above, that operate on storage pools 214 that contain objects. In one embodiment, object replicators associated with a storage pool 214 may performed rsync techniques known in the art on remote storage pools to determine appropriate data to push data to remote storage pools. However, as object replication times may increase using this method when the file storage system 100 gets sufficiently large, a hash of the contents for each suffix directory may instead be saved to a per-partition hashes file, and the hash for a given suffix directory is then invalidated when the contents of that suffix directory are modified. The object replicator may then read these hash files, calculate any invalidated hashes, and transmit the hashes to each remote storage pool 214 that should hold the partition, and only suffix directories with differing hashes on the remote server are then rsynced. After pushing data to the remote storage pools 214, each rsynced suffix directory has its hashes recalculated. Object replicator performance is generally bound by the number of uncached directories it has to traverse, usually as a result of invalidated suffix directory hashes.

In one embodiment, the file storage system 100 is designed so that around 2% of the hash space on a normal storage pool 214 will be invalidated per day.

Updaters

Updaters are implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108, and may include instructions that, when executed by a processor, process updates that may have failed. An updater may be provided with each storage pool (e.g., on a server that includes the storage pool) to process failed updates. For example, there may be times when container or account data will not be immediately updated. Such incidents may occur during failure scenarios or periods of high load. If an update of a stored entity fails, the update is queued in a storage pool 214 on the file storage system 100, and the updater that is associated with that storage pool 214 will process the failed updates. In such situations, a consistency window is used. For example, suppose the container service 210 is under load and a new object is put in to the file storage system 100. The object will be immediately available for reads as soon as the proxy 204 responds to the user 202 that the object has been successfully added to the file storage system 100. However, due to the heavy load, a container service 210 may not have been able to update its object listing, and so that update would be queued for a later update. Container listings, therefore, may not immediately contain the object, although the object has been saved and replicated within the applicable object storage pool area. In one embodiment, the consistency window needs only to be as large as the frequency at which the updater runs.

Multi-Cluster Container Synchronization

In the context of a multi-cluster system such as the system described in FIG. 4, multi-cluster replication and synchronization is necessary. The multi-cluster synchronization systems build on the single-cluster systems described above, but adapt for the differences in latency and control that are likely between different clusters. To the extent applicable, the multi-cluster systems include similar services, components, and capabilities to those described above.

Multi-cluster replicators are implemented in a tailored electrical circuit or as software instructions to be used in conjunction with a processor to create a hardware-software combination that implements the specific functionality described herein. To the extent that one embodiment includes computer-executable instructions, those instructions may be implemented as software that is stored on a computer-readable medium located in the storage management server 106 and/or the storage servers 108 within each cluster 250*a-n*, and may include instructions that, when executed by a processor, keep the elements of the multi-cluster file storage system 240 in a consistent state across cluster boundaries.

The multi-cluster replicators can be invoked abstractly, in a manner consistent with the intra-cluster replicators, but with reduced immediate availability guarantees due to increased latency and higher synchronization overhead. This has the advantage of being transparent to users of the file storage system, but in some instances may also be less transparent in its operation and limitations.

For example, one embodiment of the multi-cluster file storage system 240 allows for a configurable number of remote replicas. In this embodiment, the number of such remote replicas may be specified to the multi-cluster replication system using appropriate attributes of the request(s) associated with establishing the remote replication target(s). To the extent that specifying the remote replica count on a per container basis adds complexity to the replication system, the incorporated functionality allowing cluster-wide replica counts can be leveraged to count remote replicas, with but with less particularized control over the location of and circumstances of each replica. Thus, in an alternative embodiment, the remote replica count is not per se configurable, and the number of replicas the remote cluster is indirectly configured as part of the total replica count.

Note that multi-cluster replication and synchronization will in most cases be a per-account feature, with granularity down to a container or object level. While certain guarantees can be made about replication by the cloud services provider, most times customers will not want to pay for widely distributed storage—either in cost, or in the increased latency and decreased performance associated with widely dispersed replicas. This is especially so when the different clusters are provided by more than one organization, such as live mirroring of important data between two independent cloud service providers, perhaps in different regions. In that case, an end user will need to have accounts and control the interaction between the two different service providers. In these cases, increased control over specific inter-cluster replication and synchronization characteristics is not only desirable but necessary. Accordingly, the multi-cluster replication system has alternative embodiments that allow more discrete control over inter-cluster replication and synchronization as described below.

Figure 9:
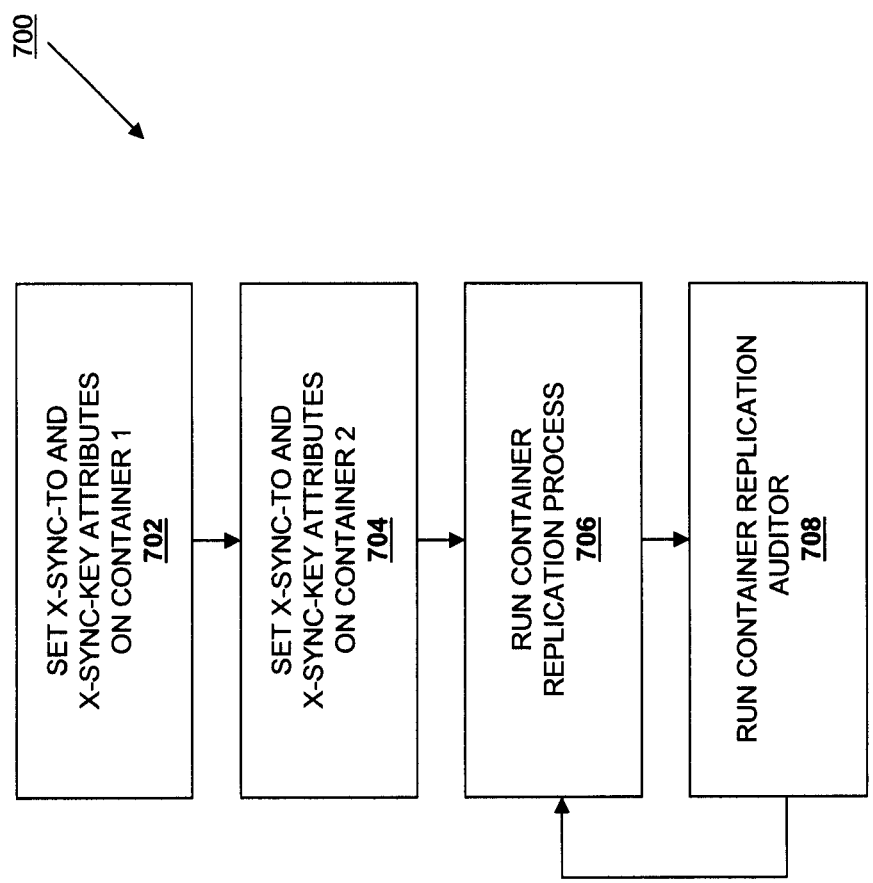
FIG. 9 is a flow chart illustrating an embodiment of a method for assigning replication and trust targets between containers.

FIG. 9 shows a method 700 of specifying container synchronization targets and authorization using X-Container-Sync-To and X-Container-Sync-Key attributes to control the container synchronization mechanism. In the discussion below, the information associated with the account and authorization is included in the headers of the request, the data in the body of the request, and the target specified via a URL. Various embodiments of this functionality will be described relative to the "st" tool, a command that generates HTTP/1.1-compliant GET, POST, DELETE and similar requests. Similar HTTP request functionality is available and known in the art. Other available mechanisms include communications protocols known in art such as, without limitation, rsync, XMPP, SIP, SOAP, XML-RPC, or CORBA.

The method begins at step 702, including setting a first container's X-Container-Sync-To attribute to a second container's URL, and the X-Container-Sync-Key attribute to a key value. This can be achieved using the following command:

$ st post-t https://cluster2/v1/AUTH_[user]/container2-k [secret value] container1

Step 704 includes setting a second container's X-Container-Sync-To attribute to first container's URL, and the X-Container-Sync-Key attribute to the same key value as the first container. This provides the embodiments of the object storage system the identification of the synchronization target and corresponding secret key. This purpose can be achieved with the following command:

$ st post -t https://cluster1/v1/AUTH_[user]/container1 -k [secret value] container2

After steps 702 and 704, the objects in the first and second containers are set to be synchronized but are not yet synchronized. The actual replication and synchronization is done at step 706 using the container replication process. The container replication process uses the container replication and object replication structures described with reference to the intra-cluster replication and can optionally be performed by the same process or by other specialized replicators running in parallel. In this embodiment the container replication process is performed on a periodic basis. If the synchronization of step 706 is performed on a periodic basis, then the system cannot provide a guarantee as to when a change will make it to the remote cluster. For example, a successful completion of the PUT request indicates that cluster has the object, not the remote cluster. The synchronization of the containers happens in the background.

In other embodiments the replication and synchronization process run based upon the occurrence of an event, such as the specification of a container to synchronize to (performing initial synchronization simultaneously) or on the addition of a new object to a container. This can provide higher-quality guarantees, but individual actions may take longer to complete and may see a higher request failure rate.

In one embodiment, container synchronization mechanism at step 706 is managed by one or more daemon processes that control the synchronization of the data objects between individual container servers. Daemon processes are computer processes that run in the background, rather than under the direct control of a user; and that are usually initiated as background processes.

In one embodiment, a daemon runs on each container server. The daemon scans every container database looking for containers that are configured to sync, and sends synchronization updates to proper entity based on any newly detected ROWIDs in the container database that represent containers that need to be synchronized. In another embodiment, a single daemon runs per cluster that manages synchronization for all servers in the cluster. In yet another embodiment, one daemon handles synchronization for a configurable number of servers.

In one embodiment, each daemon process may be configured to only spend a certain predetermined amount of time trying to sync to a given container. This avoids one frequently updated container causing updates for other containers to not be processed or delayed. In various embodiments, this amount of time may be the same or different for each container to be synced. In one or more embodiments, the aforesaid amount of time may be determined based on an individual synchronization frequency or priority attribute value assigned to the individual container to be synchronized during the sync configuration process.

In one embodiment, the daemons managing the container synchronization mechanism are coordinated to ensure that synchronization messages between container servers are always sent. For example, if a specific container is synced to three different container servers, there are three possible daemons that can cause a synchronization message to be generated. If each daemon only does one third of the synchronizations, this one third of synchronizations will be lost if one of the container servers executing the aforesaid daemon is down. On the other hand, if all three daemons are configured send all the synchronization messages, then the system will be inefficient due to over-redundancy. Therefore, in one embodiment, the aforesaid three daemons are configured such that each daemon sends two thirds of the possible synchronization messages. In this configuration, the aforesaid double redundancy assures that no synchronization messages will be lost if one of the three container servers becomes inoperable.

In one or more embodiments, the container synchronization is performed by the container synchronization daemons in the pass-by-pass manner. Each execution of the daemon results in one round of replication pass. In one or more embodiments, the container synchronization daemon accumulates and logs various statistics related to the currently running replication pass.

In one embodiment, the daemon on each container server keeps sync points in the local container databases that control how synchronization message are sent. For example, the daemon may keep a first sync point for the newest ROWID known and a second sync point for the newest ROWID for which all synchronization updates have been sent. In this example, any row updated that is newer than both sync points will cause a synchronization update to be sent if the corresponding container server is designated to send that update. Typically, if three container servers are configured to synchronize a container, each server will handle one third of the synchronizations. In addition, if any row between the two sync points is updated, all three servers will send a synchronization message. This ensures that such synchronizations will be processed even if a server is down.

An exemplary operational scenario of the inventive container replication mechanism in accordance with one embodiment of the invention will now be described. The aforesaid exemplary operational scenario assumes a configuration with three container replicas as well as perfectly matching ROW-IDs starting at 1. During the first container synchronization run, the database stores six rows:

- SyncPoint1 starts as −1.
- SyncPoint2 starts as −1.
- No rows between points, so no "all updates" rows.
- Six rows newer than SyncPoint1, so a third of the rows are sent by node 1, another third by node 2, remaining third by node 3.
- SyncPoint1 is set as 6 (the newest ROWID known).
- SyncPoint2 is left as −1 since no "all updates" rows were synced.

In the next container synchronization run, the database has 12 rows:

- SyncPoint1 starts as 6.
- SyncPoint2 starts as −1.
- The rows between −1 and 6 all trigger updates (most of which should short-circuit on the remote end as having already been done).
- Six more rows newer than SyncPoint1, so a third of the rows are sent by node 1, another third by node 2, remaining third by node 3.
- SyncPoint1 is set as 12 (the newest ROWID known).
- SyncPoint2 is set as 6 (the newest "all updates" ROWID).

In the described way, under normal circumstances, each node sends its share of updates each run and just sends a batch of older updates to ensure nothing was missed.

As would be appreciated by those of skill in the art, a crash of a container server may cause lost container database copies. In an embodiment, the aforesaid lost copies are replaced by one of the remaining container database copies on the other container servers. The reestablished server then receives the sync point information from the container database copy. As would be appreciated by those of skill in the art, no updates are lost due to the described "all updates" algorithm the other two container servers use. It should be also noted that rebalancing the container ring moves container database copies around, but results in the same behavior as a crashed server would.

As would be appreciated by those of skill in the art, in bi-directional synchronization configurations, the receiving container server will send back the received updates to the sending container server. To prevent this situation, one embodiment operates to track where synchronization updates were received from and prevent sending synchronization back to their original sender.

Step 708 uses a container replication auditor to verify correct synchronization and replication of the data. While this step is optional, it can be used to ensure better data availability and replication confidence levels when using widely-dispersed clusters that don't support real-time replication guarantees. The container replication auditor can operate at a metadata level, checking only file names and file sizes, or it can use cryptographic or content hashes to determine differences with very high confidence. In one embodiment, the container replication auditor pre-computes the hashes for the container using the rsync algorithm so that cross-network synchronization using rsync is accomplished more quickly.

Figure 11:
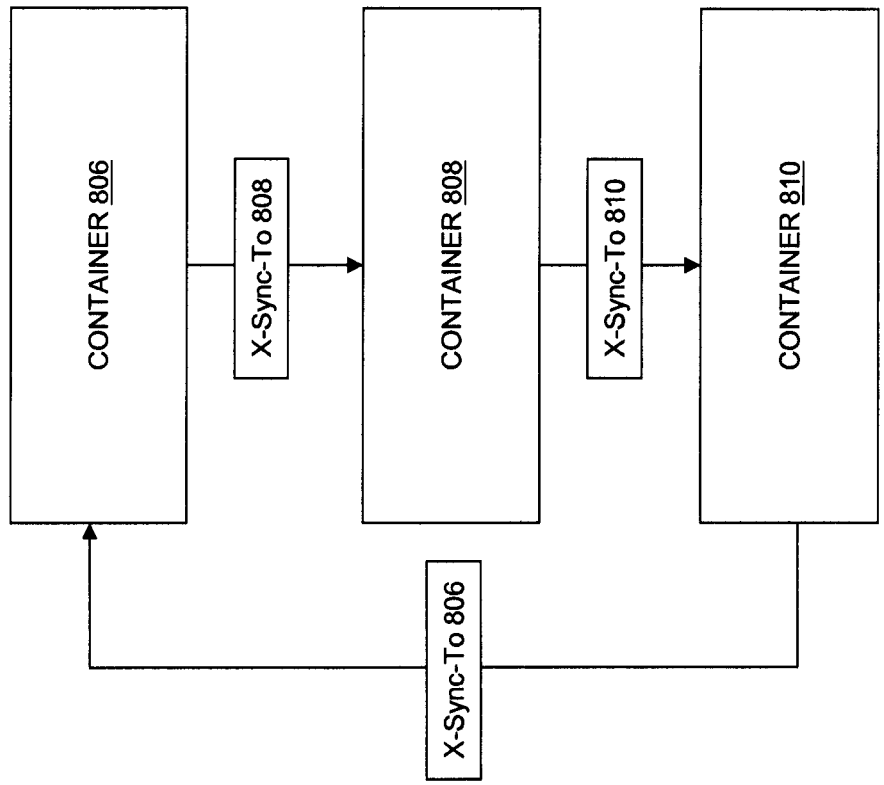
FIG. 11 is a schematic view illustrating a second embodiment of a container replication structure.
Figure 10:
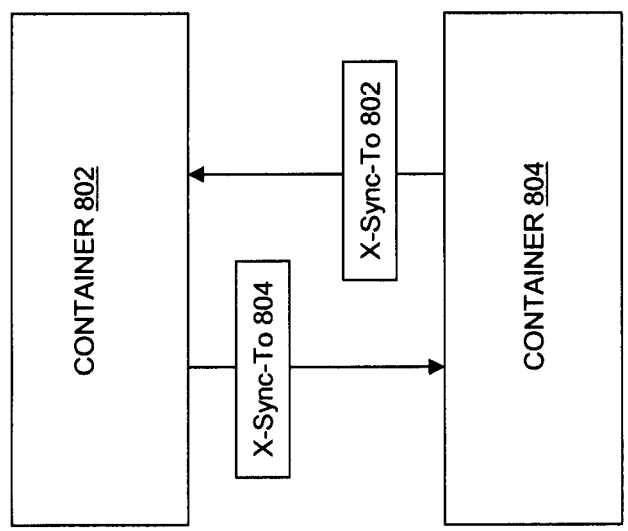
FIG. 10 is a schematic view illustrating a first embodiment of a container replication structure.
Figure 12:
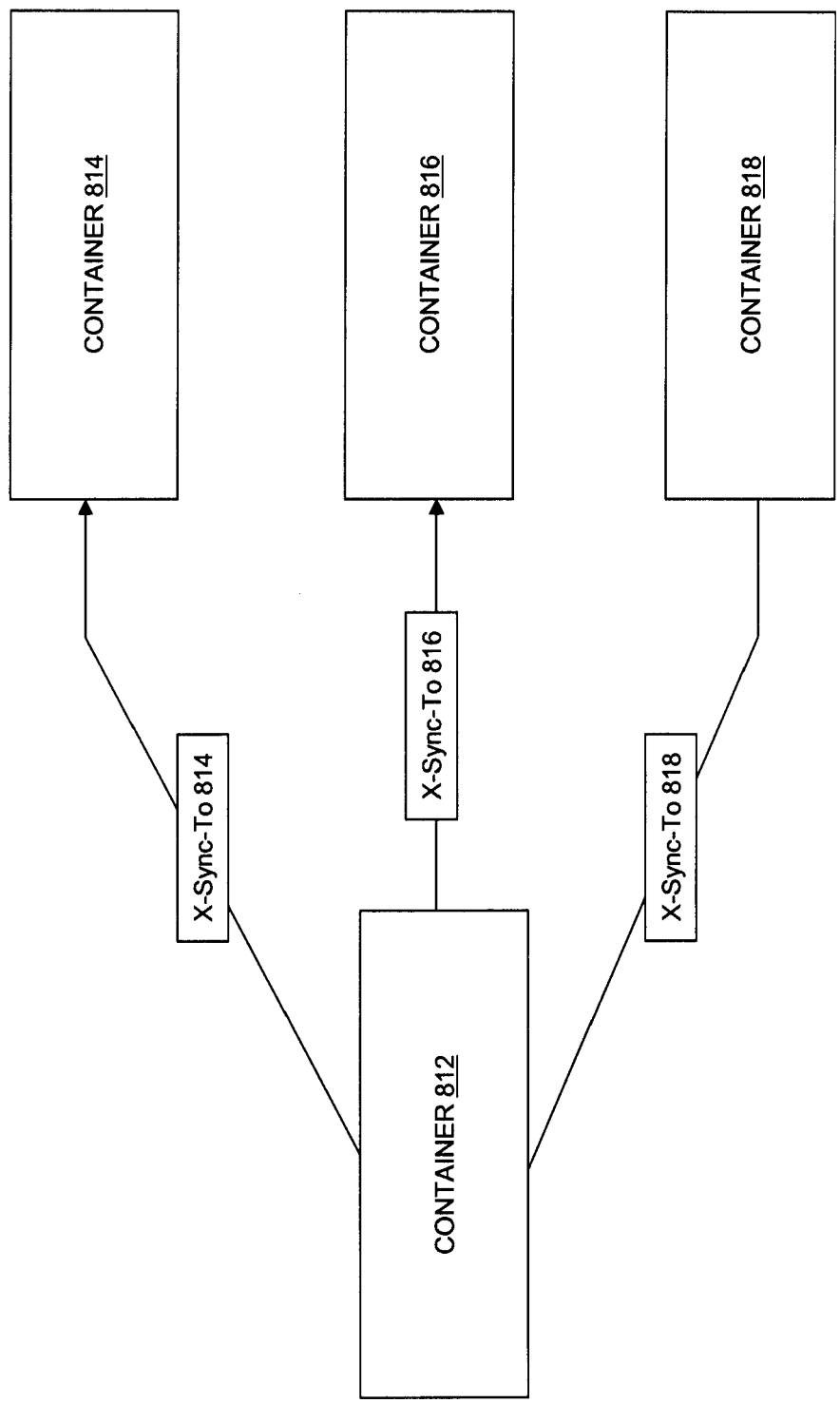
FIG. 12 shows an embodiment with multiple containers linked in a synchronization tree.

FIGS. 10-12 show three different container replication structures that can be created. These container replication structures are only exemplary and not limiting. More specifically, these three basic structures can be expanded or combined to provide any require replication structure.

FIG. 10 shows the most basic reciprocal replication, with just two containers, 802 and 804. Each of these containers is set up to replicate to the other. The replication structure of FIG. 10 can be used to perform simple replication of important data between two geographically dispersed clusters or two clusters in different organizations. Within each cluster, the existing replication structures would provide intra-cluster redundancy based on the ring structure.

FIG. 11 shows a second embodiment with multiple containers linked in a synchronization chain. In such a configuration, a first container 806 is configured to sync to a second container 808, which is then configured to sync to a third container 810. The third container 810 is then configured to sync to the first container 806, completing the synchronization chain. In such an embodiment, an arbitrary number of containers may be included in the aforesaid synchronization chain.

FIG. 12 shows a third embodiment with multiple containers linked in a synchronization tree. In such a configuration, a first container 812 is configured to sync simultaneously to a second container 814, a third container 816, and a fourth container 818. Note that this synchronization is one-way—there is no return synchronization. A synchronization tree can be used for effective replication of shared assets out to a number of distinct physical locations, such as for a content delivery network.

Although the examples above have been described with reference to inter-cluster synchronization, another use for the synchronization techniques described in the above embodiments is a live account migration. In such a procedure, an account in a first cluster is set to sync to an account in a second cluster. The second cluster may or may not be controlled by the same cloud service provider. After a period of time, the account on the second cluster will be synced with the account on the first cluster. At that point, the authentication response URL for the account can be switched from the first cluster to the second cluster, and all existing account tokens can be revoked. The account on the first cluster is then put into read-only mode, and syncing from the account on the first cluster to the account on the second cluster is turned off. After a time long enough to ensure the account on the first cluster is no longer being used, this account may be purged.

As it would be appreciated by those of skill in the art, in one or more embodiments, a valid replication target container, which is specified in the X-Container-Sync-To destination attribute, must be configured for each cluster ahead of time. In an embodiment, this feature is implemented based on cluster trust.

In the embodiments described above, cluster trust is achieved through the use of a user-provided shared secret that is keyed to a particular account. This shared secret can be considered equivalent to a password and can be used to form challenge-response pairs indicating knowledge of the secret key by the containers on either side of the replication transaction.

In some embodiments, it may not be desirable to use a single shared key. For example, a synchronization tree that provided content from a single upstream provider to a number of competitive downstream providers may not want to use a single key providing access to all of the containers in the tree, including the upstream container. In this embodiment, a public-private key mechanism is used, either through explicit keys or through the use of certificates.

Figure 13:
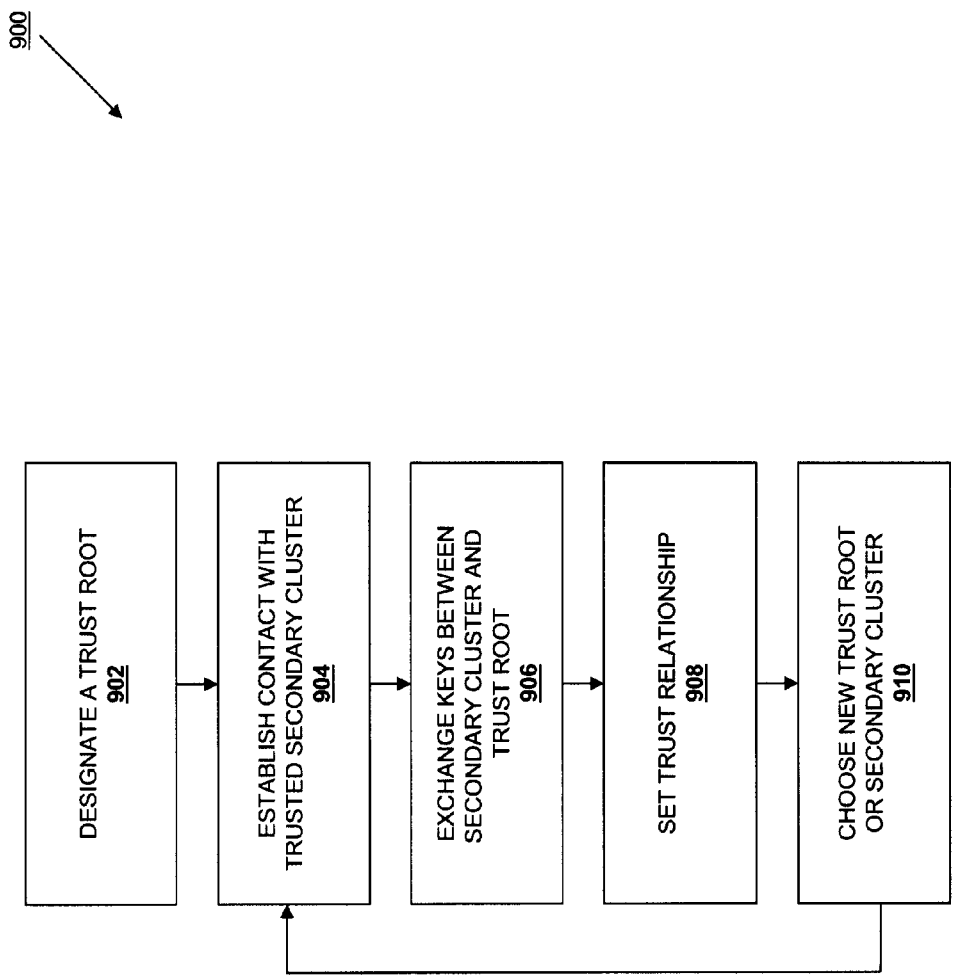
FIG. 13 shows a method for establishing cluster trust in a public/private key setting.

FIG. 13 shows a method 900 for establishing cluster trust in a public/private key setting. The method 900 begins at step 902, wherein the user engages a first cluster and designates it as a trust root. The trust root may be arbitrary, in cases where the eventual replication will be circular, or it may be the cluster holding the container at the root of the synchronization tree.

At step 904, the cluster at the trust root establishes network contact with the cluster. Because the container synchronization can occurs at the logical container level, access to the container data structure needs to be reachable from the trust root. The network contact can be provided in a number of different ways. In a first embodiment, the container and object services are directly addressable from any public network, and misuse of the services is prevented by using an authenticated API for all requests. In a second embodiment, the container server is not directly addressable, but must go through a proxy. This has the benefit of hiding the internal structure of the second cluster from the outside and allows all requests to go through the same path, but it also may require more computation on the part of the replicator at the trust root to discover and deal with differences. In a third embodiment, there is a tunnel allowing effective direct access between the services at the trust root and the services at the secondary cluster, without having the services directly exposed to the public internet. This may be accomplished by using a tunnel server with port mapping, allowing apparently direct access that in reality is tunneled to the service layer at the secondary cluster. In a fourth embodiment, there is a shared line between the first and second cluster, for especially high volume and low latency replication.

In one or more embodiments, the authentication mechanism of the object storage system as well as the container server reference a list of hosts indicating the allowed remote clusters for container synchronization. The embodiment operates to ensure that only the containers located on the listed clusters are allowed to synchronize with the local containers.

At step 906, the trust root creates or imports an existing public/private keypair. It then imports the public keys from the secondary cluster to the trust root and sends the public key from the trust root to the secondary cluster. This allows for the cryptographic verification of identity from one cluster to another.

At step 908, the trust root connects to the secondary cluster and establishes the trust relationship from the trust root to the secondary node. In one embodiment, this is done using st:
$ st post -t https://cluster2/v1/TRUST_[user]-priv [root_priv_key] -pub [secondary_pub_key]

This command sets the trust relationship for a certain user between the trust root (where this is being run) and the secondary cluster (cluster2).

In the final step 910, a new trust root or secondary cluster is chosen if necessary, and the process repeats from step 904. For example, in the case of reciprocal replication relationships as in FIGS. 10 and 11, each cluster would be both a trust root and a secondary cluster. In a tree-based relationship as in FIG. 12, a new secondary cluster would be chosen and the trust would be established with that cluster.

Another embodiment using public/private keys leverages SSH. In an embodiment that uses SSH, each cluster is provided with a public key corresponding to a private key held either by the user or by a designated trust root. Using the agent forwarding functionality of SSH, each individual cluster can use the same authentication credentials without having the necessary reverse credentials to abuse the trust relationship. Other embodiments can use existing authentication infrastructure such as OAUTH, XAUTH, X.500, LDAP, or Kerberos.

One other use for the cluster trust mechanism is for cluster federation. Referring briefly to FIG. 4, a multi-cluster ring or proxy may need to have authentication information to associate with and interoperate with the various clusters. The same cluster trust mechanisms described above also allow virtual multi-cluster, multi-vendor clouds and federation between clusters on one provider or in one region and clusters in another.

As it would be appreciated by those of skill in the art, in one or more embodiments, the replication system must provide enough network communication bandwidth between the clusters in the synchronization pair or synchronization chain in order to keep up with all the changes to the synchronized containers. In one or more embodiments, the system would automatically test available network communication bandwidth between clusters and generate a warning or other appropriate message when the available bandwidth is not adequate for proper synchronization. This operation could be performed when the container synchronization pair or chain is established. It should be also understood that in some implementation, there could be a burst of bandwidth use when the synchronization feature is turned on for an existing container containing a significant number of objects.

As noted above, one method for minimizing the bandwidth used for container replication using rsync or a similar protocol that only transmits differences between two files across the network connection between the first and second containers. One place where rsync is less efficient, however, is the calculation and transmission of information for a large number of files. Each transmission includes a certain amount of per-file and per-connection overhead. When the average size of the replicated object is large, the overhead is negligible compared to the total data transfer that needs to occur. When there are only minor differences, or there are lots of files, the latency and overhead associated with rsync can make it less efficient.

In various embodiments, the replication process uses a compression scheme for packing multiple objects in a container into a single virtual file for synchronization and replication between the clusters. In a first embodiment, this compression scheme aggregates files based upon the size of the disk block holding the objects. For example, if the disk block size is 4 mb, then files smaller than 4 mb could be aggregated into a single virtual file and sent over as a unit. In this case, the reading and writing of the objects could be accomplished at a higher speed with less fragmentation of the underlying disk.

In a second embodiment, objects are aggregated based on a heuristic associated with low total differences. For example, the replicator can identify all objects in a particular container that have the same name and size since the last replication pass and bundle all of them into a single virtual file. While it is possible that files with the same filename and filesize could still have changed inside the file, this quick heuristic would allow the many files that had not changed to be synchronized with a single network trip, reducing overhead.

A third embodiment looks at the disk blocks corresponding to a particular container and transfers all of the underlying changes as a single virtual file. This has the advantage of reducing the overhead associated with the network transfer to the minimum, but has two disadvantages. First, the objects in a container may not be in one particular place on the disk, and so a virtual disk image may need to be created on the fly. Second, this relies on one single transfer to be effective; if anything happens during the transmission of the single virtual file, then the entire transfer needs to be redone. A similar issue arises with large files; for files of multiple GB in size, transfer of the entire file may fail, resulting in a need to re-try the transfer.

Accordingly, a fourth embodiment uses a sliding scale to determine the optimal point of bandwidth usage versus transfer reliability. This embodiment begins with a certain target size file, such as 4 MB, and dynamically increases or decreases the target size based upon network performance. If there is more bandwidth to spare, then the target size of the transferred file can be doubled one or more times up to some limit (such as, for example, 256 MB). The actual objects in the container can be manipulated to approach the target size for the transferred file by either combining files (in the case of files smaller than the target transfer size) or by partitioning files (in the case of files larger than the target transfer size). In this manner, the network transfer can occur at a speed that optimizes for performance based upon actual observed conditions. Network conditions can be observed through observing throughput of the process, by analyzing ping times, or by receiving information back from the underlying operating system relative to the TCP window being used for the transfer.

In one or more embodiments, the container synchronization process described herein is adopted to provide account synchronization functionality. Specifically, account synchronization is performed between a first account established on a first cluster and a second account established on the second cluster. To this end, two account containers are created on the respective clusters and configured to sync in the manner described above. The container synchronization system described above ensures synchronization of the accounts, including replication of the delete and post requests to the target account container.

In an embodiment of a multi-cluster system such as the system described above, each cluster may be in a different zone. If a multi-cluster ring is used, ring can be used to directly address zones that are in different clusters transparently. If a two-tier system is used, with a multi-cluster ring as well as a per-cluster ring, then the multi-cluster ring maps requests to the appropriate clusters, and the per-cluster rings map to zones within the cluster. For a multi-cluster ring, it may be acceptable to have redundancy across a lower number of clusters, such as two, particularly if the different clusters are in different regions; clusters in different physical regions are much less likely to have correlated failures and so a cluster in a second region can be used as a "hot spare."

In this case, the multi-cluster file storage system 240 is configured to provide greater availability and durability with geographically distinct replicas. The concept of availability zones described above is sufficient for most high-availability deployments, but rare regional failures are known that affect multiple availability zones located within the same geographical region. Thus, multi-region replication, wherein the same object/container/account are replicated in two or more different geographical zones allows service availability in the face of regional disruptions in service. The embodiments of the inventive concept accomplish this purpose by providing multi-region replication between geographically different or logically distinct object storage systems. Thus, availability of the object replicas is not affected by the aforesaid regional disruptions in service.

Using one of the methods described above, the multi-region replication system is configured to target a second object storage cluster as a partition target for replication. The aforesaid targeted second object storage cluster may be located within a different geographic region, as may be automatically determined by the replication system based on appropriate attributes or other relevant stored metadata. Once the replication target has been specified in the described manner, replication between the affected partitions occurs in as described above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

The invention claimed is:

1. A system for coordinating a plurality of clusters, the system comprising:
   a multi-cluster gateway, the multi-cluster gateway communicatively coupled to a first cluster and a second cluster, wherein the first cluster includes a first plurality of information processing devices and the second cluster includes a second plurality of information processing devices;
   wherein the multi-cluster gateway includes a multi-cluster ring, wherein the multi-cluster ring performs a consistent hashing function responsive to a request to interact with the system, and wherein an output of the consistent hashing function is a partition identifier corresponding to computing resources available at one of the first cluster and the second cluster;
   wherein the multi-cluster ring performs a constrained mapping function on the partition identifier, and wherein an output of the constrained mapping function maps the partition identifier to a responsive cluster from one of the first cluster and the second cluster in accordance with a desired storage characteristic; and
   wherein the multi-cluster gateway sends a message to the responsive cluster.

2. The system of claim 1, wherein the output of the constrained mapping function further identifies a specific resource within the responsive cluster.

3. The system of claim 1, wherein the message to the responsive cluster is addressed to the specific resource within the responsive cluster.

4. The system of claim 1, wherein the multi-cluster gateway receives a return message from the responsive cluster responsive to the request to interact with the system.

5. The system of claim 1, wherein the multi-cluster gateway further includes a proxy module.

6. The system of claim 5, wherein the proxy module sends a return message from the responsive cluster in response to the request to interact with the system.

7. The system of claim 1, wherein the consistent hashing function is a first-level hashing function and the constrained mapping function is a second-level hashing function, wherein one of the first cluster and the second cluster further comprises a cluster-level ring that performs a third-level hashing function responsive to a message identifying the cluster as a responsive cluster, wherein an output of the third-level hashing function is a cluster-level partition associated with the resources available within the cluster.

8. The system of claim 7, wherein the cluster-level ring performs a fourth-level hashing function, wherein an output of the fourth-level hashing function identifies a specific responsive resource associated with the cluster-level partition.

9. A system for coordinating a plurality of clusters, the system comprising:
   a multi-cluster gateway, the multi-cluster gateway communicatively coupled to a first cluster and a second cluster, wherein the first cluster includes a first plurality of information processing devices and the second cluster includes a second plurality of information processing devices;
   wherein the multi-cluster gateway sends a message to one of the first cluster, second cluster, or both clusters responsive to a request to interact with the system;
   wherein one of the first cluster and the second cluster includes a cluster-level ring, wherein the cluster-level ring performs a consistent hashing function responsive to a message, wherein an output of the consistent hashing function is a partition identifier corresponding to computing resources available at one of the first cluster and the second cluster; and
   wherein the cluster-level ring performs a constrained mapping function on the partition identifier, and wherein an output of the constrained mapping function maps the partition identifier to a specific responsive resource associated with the partition in accordance with a desired storage characteristic.

10. The system of claim 9, wherein the multi-level gateway receives a responsive message from a cluster and sends a response to the request.

11. The system of claim 9, wherein only one of the first cluster and the second cluster is a responsive cluster, and wherein a response to the request is sent by the responsive cluster.

12. The system of claim 9, wherein either of the first cluster and the second cluster can be a responsive cluster, and wherein the first cluster to formulate a response sends the response.

13. The system of claim 1, wherein the constrained mapping function uses geographic distance to choose which cluster is the responsive cluster.

14. The system of claim 1, wherein the constrained mapping function uses network latency to choose which cluster is the responsive cluster.

15. The system of claim 9, wherein the multi-cluster gateway sends the message to the cluster that is closer geographically to the source of the request.

16. The system of claim 9, wherein the multi-cluster gateway sends the message to the cluster that has lower latency between the cluster and the source of the request.

17. The system of claim 1, wherein the first cluster is controlled by a first party and the second cluster is controlled by a second party.

18. The system of claim 9, wherein the first cluster is controlled by a first party and the second cluster is controlled by a second party.

19. The system of claim 1, wherein the multi-cluster ring divides the partition identifier into a plurality of parts and performs the constrained mapping function on each part of the plurality of parts, and wherein each output of the constrained mapping function identifies a partition associated with the first cluster or the second cluster.

20. The system of claim 1, wherein the request includes an object and the multi-cluster ring performs the consistent hashing function on an attribute of the object.

21. The system of claim 1, wherein the request includes an object and the multi-cluster ring performs the consistent hashing function on the object.

22. A system for coordinating a plurality of clusters, the system comprising:
 a multi-cluster gateway, the multi-cluster gateway communicatively coupled to a first cluster and a second cluster, wherein the first cluster includes a first plurality of information processing devices and the second cluster includes a second plurality of information processing devices;
 wherein the multi-cluster gateway includes a multi-cluster ring, wherein the multi-cluster ring provides a mapping between one or more entities stored in the first or second clusters and locations of the one or more entities in one or more storage pools;
 wherein the multi-cluster ring performs a consistent hash function responsive to a request to interact with the system, and wherein an output of the consistent hash function is a partition identifier corresponding to a partition that is mapped to a plurality of storage pools of the one or more storage pools;
 wherein the multi-cluster ring performs a constrained mapping function on the output of the consistent hash function, and wherein the constrained mapping function ensures that each partition is mapped to a storage pool of the plurality of storage pools in a different zone; and
 wherein the multi-cluster gateway sends a message to the responsive cluster.

* * * * *